US012236848B2

(12) United States Patent
Gai et al.

(10) Patent No.: US 12,236,848 B2
(45) Date of Patent: Feb. 25, 2025

(54) PIXEL CIRCUIT, DRIVING METHOD OF PIXEL CIRCUIT, AND DISPLAY PANEL

(71) Applicant: KUNSHAN GO-VISIONOX OPTO-ELECTRONICS CO., LTD, Jiangsu (CN)

(72) Inventors: Cuili Gai, Hebei (CN); Junfeng Li, Hebei (CN); Rubo Xing, Jiangsu (CN); Enqing Guo, Hebei (CN); Kangguan Pan, Jiangsu (CN)

(73) Assignee: KUNSHAN GO-VISIONOX OPTO-ELECTRONICS CO., LTD, Kunshan (CN)

( * ) Notice: Subject to any disclaimer, the term of this patent is extended or adjusted under 35 U.S.C. 154(b) by 0 days.

(21) Appl. No.: 18/240,752

(22) Filed: Aug. 31, 2023

(65) Prior Publication Data

US 2023/0410729 A1 Dec. 21, 2023

Related U.S. Application Data

(63) Continuation of application No. PCT/CN2022/086949, filed on Apr. 15, 2022.

(30) Foreign Application Priority Data

Sep. 10, 2021 (CN) ......................... 202111060763.1

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2320/0233* (2013.01); *G09G 2330/02* (2013.01)

(58) Field of Classification Search
CPC ........... G01S 13/426; G01S 2013/0254; G01S 2013/0263; G01S 7/03; G01S 7/032; H01Q 15/06; H01Q 17/00; H01Q 3/36
See application file for complete search history.

(56) References Cited

U.S. PATENT DOCUMENTS

2018/0166025 A1* 6/2018 Zhou .................... G09G 3/3233
2019/0066589 A1* 2/2019 He ........................ G09G 3/3233
(Continued)

FOREIGN PATENT DOCUMENTS

CN 102956192 A 3/2013
CN 104134680 A 11/2014
(Continued)

OTHER PUBLICATIONS

First Search filed on Sep. 10, 2021, in corresponding Chinese Application No. 202111060763.1, 2 pages.
(Continued)

*Primary Examiner* — Chun-Nan Lin
(74) *Attorney, Agent, or Firm* — Maier & Maier, PLLC

(57) ABSTRACT

A pixel circuit, a driving method of a pixel circuit, and a display panel. The pixel circuit includes an initialization module, a first storage module, a second storage module, a drive module, a data write module, a first light-emitting control module and a light-emitting module. The first light-emitting control module is connected between a first power supply and a first terminal of the drive module, the data write module is connected between a control terminal of the drive module and a data line, the light-emitting module is connected between a second terminal of the drive module and a second power supply, and the initialization module is configured to write an initialization voltage to the control terminal of the drive module and the light-emitting module in an initialization stage, and continuously write the initial-
(Continued)

ization voltage to the control terminal of the drive module in a compensation stage.

20 Claims, 12 Drawing Sheets

(56) References Cited

U.S. PATENT DOCUMENTS

| | | | | |
|---|---|---|---|---|
| 2021/0183310 | A1* | 6/2021 | Hu | G09G 3/3233 |
| 2021/0366397 | A1* | 11/2021 | Na | H10K 59/1213 |

FOREIGN PATENT DOCUMENTS

| | | | |
|---|---|---|---|
| CN | 106057126 | A | 10/2016 |
| CN | 106531074 | A | 3/2017 |
| CN | 107301839 | A | 10/2017 |
| CN | 108630141 | A | 10/2018 |
| CN | 108665852 | A | 10/2018 |
| CN | 111583870 | A | 8/2020 |
| CN | 111710296 | A | 9/2020 |
| CN | 111883043 | A | 11/2020 |
| CN | 111986612 | A | 11/2020 |
| CN | 112509518 | A | 3/2021 |
| CN | 112820242 | A | 5/2021 |
| CN | 113299230 | A | 8/2021 |
| CN | 113781964 | A | 12/2021 |
| KR | 1020180060436 | A | 6/2018 |
| KR | 1020180122592 | A | 11/2018 |

OTHER PUBLICATIONS

International Search Report mailed on Jun. 29, 2022, in corresponding International Application No. PCT /CN2022/086949, 5 pages.
Office Action issued on Jul. 19, 2022, in corresponding Chinese Application No. 202111060763.1, 12 pages.
Office Action issued on Sep. 26, 2022, in corresponding Chinese Application No. 202111060763.1, 7 pages.
Office Action issued on Jul. 19, 2024, in corresponding Korean Application No. 10-2023-7029374, 29 pages.

* cited by examiner

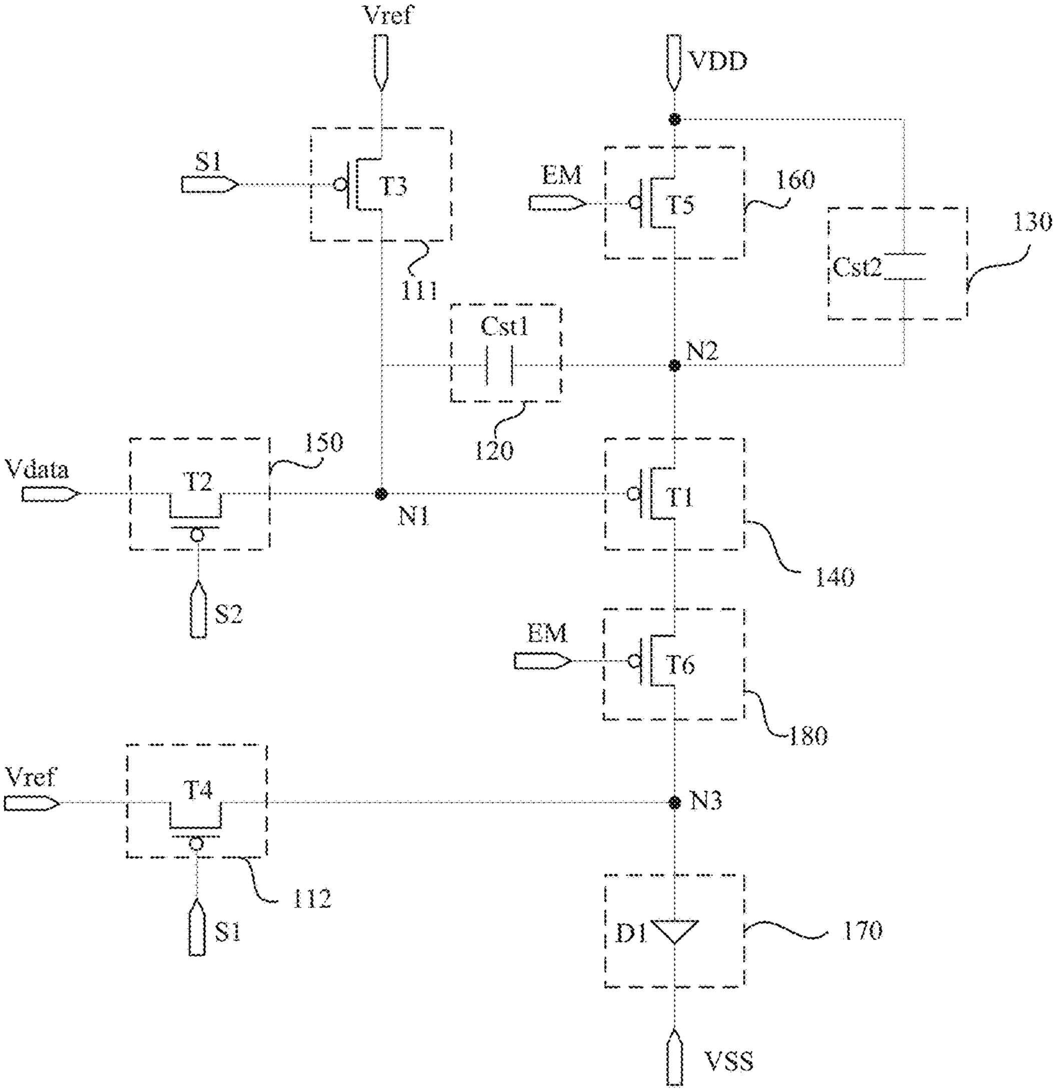

FIG. 12

| In an initialization stage, write, by the initialization module, an initialization voltage to the control terminal of the drive module and the light-emitting module to initialize the control terminal of the drive module and the light-emitting module, and continuously write, by the initialization module, the initialization voltage to the control terminal of the drive module in a compensation stage | ⌇S110 |

| In a data write stage, transmit, by the data write module, a data voltage provided by a data line to a control terminal of the drive module | ⌇S120 |

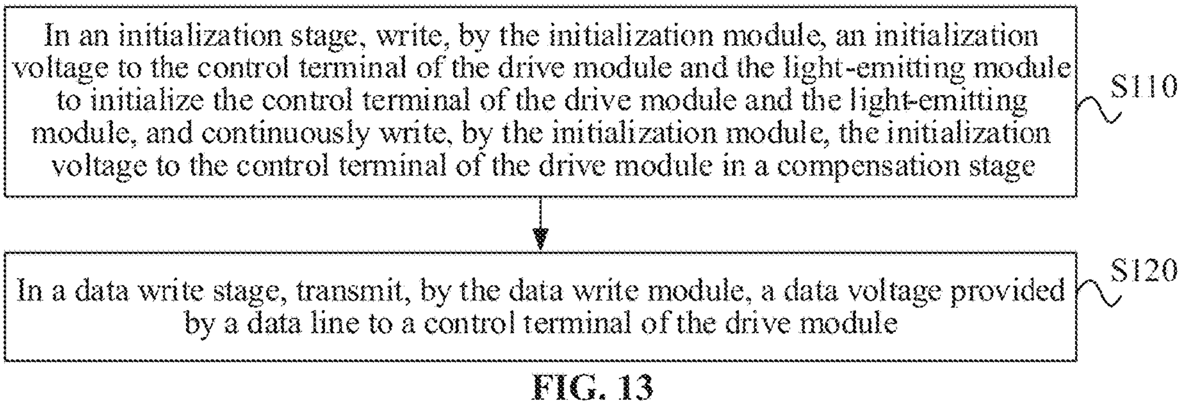

FIG. 13

PIXEL CIRCUIT, DRIVING METHOD OF PIXEL CIRCUIT, AND DISPLAY PANEL

CROSS-REFERENCE TO RELATED APPLICATIONS

This application is a continuation of International Patent Application No. PCT/CN2022/086949, filed on Apr. 15, 2022, which claims priority to a Chinese Patent Application No. 202111060763.1 filed on Sep. 10, 2021, disclosures of both of which are incorporated herein by reference in their entireties.

TECHNICAL FIELD

Embodiments of the present application relate to the field of display technologies, and in particular, to a pixel circuit, a driving method of a pixel circuit, and a display panel.

BACKGROUND

The organic light-emitting diode display panel emits light in a current driving manner, so that the characteristics of a driving device may affect the display gray scale brightness, and when the difference of features of driving devices corresponding to different pixels is too large, the phenomenon of uneven image quality is easily caused.

In the related art, a manner of compensating a threshold voltage of a pixel circuit is generally used to improve the uniformity of the brightness of the whole display picture. However, in the related technical scheme, the compensation time of the pixel circuit is limited, so that a compensation range of the threshold voltage is relatively small, and thus the requirement for the uniformity of the display brightness cannot be satisfied.

SUMMARY

Embodiments of the present application provide a pixel circuit, a driving method of a pixel circuit, and a display panel, so as to improve the uniformity of the display brightness.

In a first aspect, an embodiment of the present application provides a pixel circuit. The pixel circuit includes an initialization module, a first storage module, a second storage module, a drive module, a data write module, a first light-emitting control module and a light-emitting module. The first light-emitting control module is connected between a first power supply and a first terminal of the drive module, and is configured to transmit a voltage provided by the first power supply to the first terminal of the drive module after the first light-emitting control module is switched on. The data write module is connected between a control terminal of the drive module and a data line, and is configured to transmit a data voltage provided by the data line to the control terminal of the drive module in a data write stage. The light-emitting module is connected between a second terminal of the drive module and a second power supply. The first storage module is connected to the control terminal of the drive module, and is configured to store a voltage of the control terminal of the drive module. The second storage module is configured to store a voltage of the first terminal of the drive module or a voltage of the second terminal of the drive module. The initialization module is configured to write an initialization voltage to the control terminal of the drive module and the light-emitting module in an initialization stage to initialize the control terminal of the drive module and the light-emitting module, and continuously write the initialization voltage to the control terminal of the drive module in a compensation stage.

In a second aspect, an embodiment of the present application further provides a driving method of a pixel circuit. The pixel circuit includes an initialization module, a first storage module, a second storage module, a drive module, a data write module, a first light-emitting control module and a light-emitting module. The first light-emitting control module is connected between a first power supply and a first terminal of the drive module. The data write module is connected between a control terminal of the drive module and a data line. The light-emitting module is connected between a second terminal of the drive module and a second power supply. The first storage module is connected to the control terminal of the drive module and is configured to store a voltage of the control terminal of the drive module. The second storage module is configured to store a voltage of the first terminal of the drive module or a voltage of the second terminal of the drive module. The driving method of a pixel circuit includes that: in an initialization stage, the initialization module writes an initialization voltage to the control terminal of the drive module and the light-emitting module to initializes the control terminal of the drive module and the light-emitting module, and continuously writes the initialization voltage to the control terminal of the drive module in a compensation stage; and in a data write stage, the data write module transmits a data voltage provided by the data line to the control terminal of the drive module.

In a third aspect, an embodiment of the present application further provides a display panel. The display panel includes the pixel circuit provided in any of the embodiments of the present application.

According to the pixel circuit provided in the embodiments of the present application, the uniformity of the display brightness can be improved by changing the connection relationship of the circuit. The pixel circuit includes the initialization module, the first storage module, the second storage module, the drive module, the data write module, the first light-emitting control module and the light-emitting module. The first light-emitting control module is connected between the first power supply and the first terminal of the drive module, the data write module is connected between the control terminal of the drive module and the data line, the light-emitting module is connected between the second terminal of the drive module and the second power supply, and the initialization module is configured to write the initialization voltage to the control terminal of the drive module and the light-emitting module in the initialization stage to initialize the control terminal of the drive module and the light-emitting module, and continuously write the initialization voltage to the control terminal of the drive module in the compensation stage. According to the technical schemes provided in the embodiments of the present application, initializing the control terminal of the drive module and writing the data voltage to the control terminal of the drive module are implemented through two independent paths, respectively, so that the threshold compensation is performed before the data voltage is written to the control terminal of the drive module. It is precisely since initializing the control terminal of the drive module and writing the data voltage to the control terminal of the drive module are implemented by using different paths, and the initialization voltage is continuously written to the control terminal of the drive module in the compensation stage, so that the compensation stage and the data write stage do not affect each other, and thus the compensation time is adjustable. The fluctuation of a threshold voltage within the relatively large range can be compensated by adjusting the compensation time for the threshold voltage, so that the threshold voltage of the drive module is completely compensated, thereby reducing the difference of characteristics of drive modules corresponding to different pixels, and further improving the difference in the display brightness and improving the uniformity of the display picture quality.

BRIEF DESCRIPTION OF DRAWINGS

FIG. 12 is a schematic structural diagram of another pixel circuit according to an embodiment of the present application;

FIG. 13 is a flowchart of a driving method of a pixel circuit according to an embodiment of the present application.

DETAILED DESCRIPTION

Figure 1:
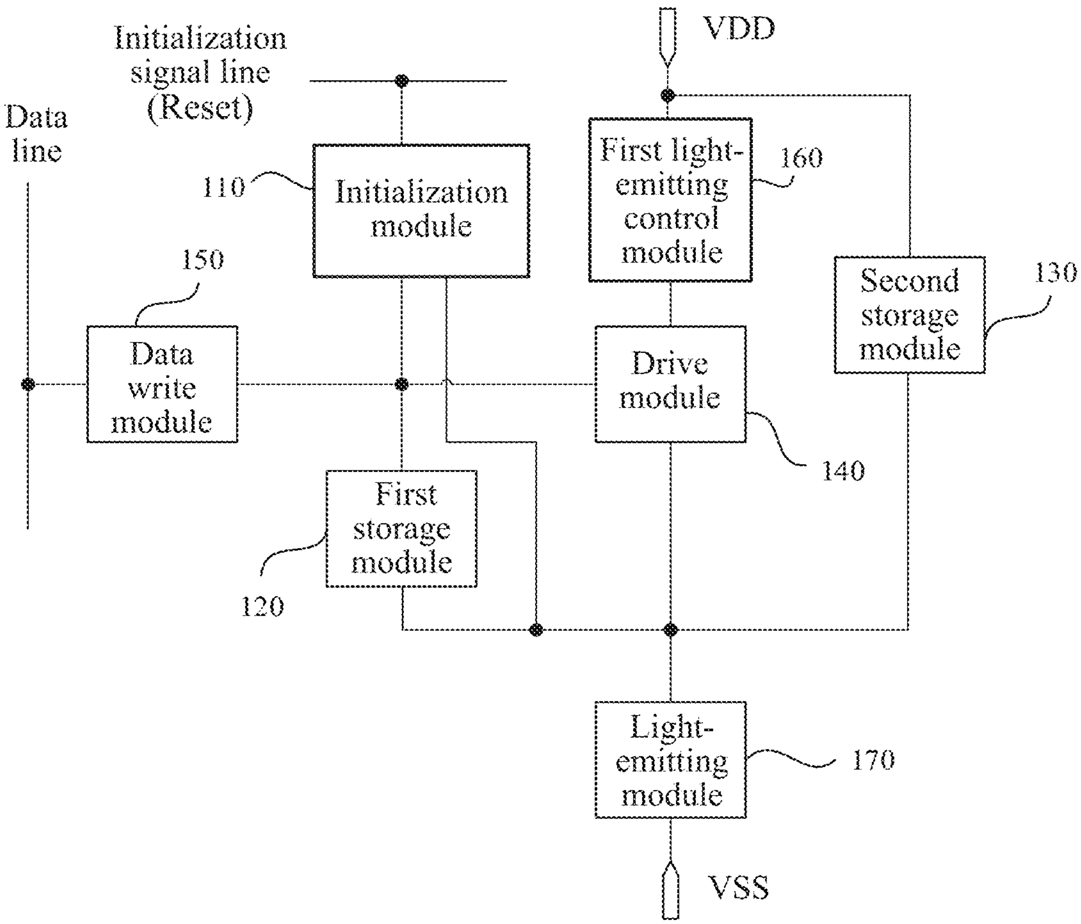
FIG. 1 is a schematic structural diagram of a pixel circuit according to an embodiment of the present application.

The present application will be further described in detail in conjunction with the drawings and embodiments below. It should be understood that the specific embodiments described herein are merely used for explaining the present application and are not intended to limit the present application. In addition, it should also be noted that, for ease of description, only some, but not all, of the structures related to the present application are shown in the drawings.

As described in the background art, the pixel circuit in the related art cannot satisfy the requirement for the uniformity of the display brightness. The reason for the above-described problems is that in a process of compensating the threshold voltage of the pixel circuit, the data write compensation and the threshold compensation are usually performed simultaneously, and the data write module is controlled to be switched on to compensate the threshold voltage of the drive module, whereby the compensation time is limited by the switch-on time of the data write module, so that the threshold compensation time is fixed, the threshold voltage is not completely compensated after the data write is finished, and thus the compensation range of the threshold voltage is limited. For the driver circuits of different pixels, differences still exist among pixel circuits, which cause different drive currents generated by the pixel circuits, and further affect the uniformity of the display brightness.

In view of the above-described problems, an embodiment of the present application provides a pixel circuit structure to improve the uniformity of the display brightness. FIG. 1 is a schematic structural diagram of a pixel circuit according to an embodiment of the present application. Referring to FIG. 1, the pixel circuit provided in the embodiment of the present application includes an initialization module 110, a first storage module 120, a second storage module 130, a drive module 140, a data write module 150, a first light-emitting control module 160 and a light-emitting module 170. The first light-emitting control module 160 is connected between a first power supply VDD and a first terminal of the drive module 140, and is configured to transmit a voltage provided by the first power supply VDD to the first terminal of the drive module 140 after the first light-emitting control module 160 is switched on. The data write module 150 is connected between a control terminal of the drive module 140 and a data line Data, and is configured to transmit a data voltage provided by the data line Data to the control terminal of the drive module 140 in a data write stage.

The light-emitting module 170 is connected between a second terminal of the drive module 140 and a second power supply VS S. The first storage module 120 is connected to the control terminal of the drive module 140, and is configured to store a voltage of the control terminal of the drive module 140. The second storage module 130 is configured to store a voltage of the first terminal of the drive module or a voltage of the second terminal of the drive module 140. The initialization module 110 is configured to write an initialization voltage to the control terminal of the drive module 140 and the light-emitting module 170 in an initialization stage to initialize the control terminal of the drive module 140 and the light-emitting module 170, and continuously write the initialization voltage to the control terminal of the drive module 140 in a compensation stage.

Specifically, the initialization module 110 is connected to each of the control terminal of the drive module 140 and a first terminal of the light-emitting module 170, and is configured to transmit an initialization voltage on an initialization signal line Reset to the control terminal of the drive module 140 and the first terminal of the light-emitting module 170. Different initialization voltages may be transmitted to each of the control terminal of the drive module 140 and the first terminal of the light-emitting module 170, so as to initialize the control terminal of the drive module 140 and the first terminal of the light-emitting module 170. The first storage module 120 is connected to the control terminal of the drive module 140. In the initialization stage, the initialization module 110 is switched on, and the initialization voltage is transmitted to each of the control terminal of the drive module 140 and the first terminal of the light-emitting module 170, so as to initialize a potential of the control terminal of the drive module 140 and a potential of the first terminal of the light-emitting module 170. A working process of the pixel circuit provided in the embodiment of the present application may at least include the initialization stage, the compensation stage and the data write stage. As shown in FIG. 1, in the compensation stage, the first light-emitting control module 160 is switched on, and is configured to transmit a voltage output by the first power supply VDD to the first terminal of the drive module 140, so that the drive module 140 is switched on, and a potential of the second terminal of the drive module 140 gradually changes. Since the initialization module 110 is configured to continuously write the initialization voltage to the control terminal of the drive module 140 in the compensation stage, when a potential of the second terminal of the drive module 140 changes to an absolute value of a difference between the initialization voltage and a threshold voltage of the drive module 140, the drive module 140 is switched off, and the first storage module 120 stores the threshold voltage of the drive module 140. In the compensation stage, Since the initialization module 110 is configured to continuously write the initialization voltage to the control terminal of the drive module 140, the data write module 150 is in an off state and cannot write a data voltage on the data line Data to the control terminal of the drive module 140. Therefore, a duration of the compensation stage is determined by a switch-on duration of the initialization module 110 and the first light-emitting control module 160, and is independent of a switch-on duration of the data write module 150. That is, initializing the control terminal of the drive module 140 and writing the data voltage to the control terminal of the drive module 140 are implemented through two independent paths, respectively, so that the data write stage and the compensation stage do not affect each other, and the initialization voltage is continuously written to the control terminal of the drive module 140 in the compensation stage. The compensation duration is adjusted by controlling switch-on durations of the initialization module 110 and the first light-emitting control module 160, so that a relatively large range of threshold voltage fluctuation may be compensated, and thus the threshold voltage is completely compensated.

It should be noted that FIG. 1 only exemplarily shows an example in which the first storage module 120 and the second storage module 130 are connected to the second terminal of the drive module 140, which is not limited thereto. In other embodiments, the second storage module 130 may also be connected between the first power supply VDD and the first terminal of the drive module 140, so as to store a voltage of the first terminal of the drive module 130.

According to the pixel circuit provided in the embodiment of the present application, the uniformity of the display brightness can be improved by changing the connection relationship of the circuit. The pixel circuit includes the initialization module, the first storage module, the second storage module, the drive module, the data write module, the first light-emitting control module and the light-emitting module. The first light-emitting control module is connected between the first power supply and the first terminal of the drive module, the data write module is connected between the control terminal of the drive module and the data line, the light-emitting module is connected between the second terminal of the drive module and the second power supply, and the initialization module is configured to write the initialization voltage to the control terminal of the drive module and the light-emitting module in the initialization stage to initialize the control terminal of the drive module and the light-emitting module, and continuously write the initialization voltage to the control terminal of the drive module in the compensation stage. According to the technical schemes provided in the embodiments of the present application, initializing the control terminal of the drive module and writing the data voltage to the control terminal of the drive module are implemented through two independent paths, respectively, so that the threshold compensation is performed before the data voltage is written to the control terminal of the drive module. It is precisely since initializing the control terminal of the drive module and writing the data voltage to the control terminal of the drive module are implemented by using different paths, and the initialization voltage is continuously written to the control terminal of the drive module in the compensation stage, so that the compensation stage and the data write stage do not affect each other, and thus the compensation time is adjustable. The fluctuation of a threshold voltage within the relatively large range can be compensated by adjusting the compensation time for the threshold voltage, so that the threshold voltage of the drive module is completely compensated, thereby reducing the difference of characteristics of drive modules corresponding to different pixels, and further improving the difference in the display brightness and improving the uniformity of the display picture quality.

Figure 2:
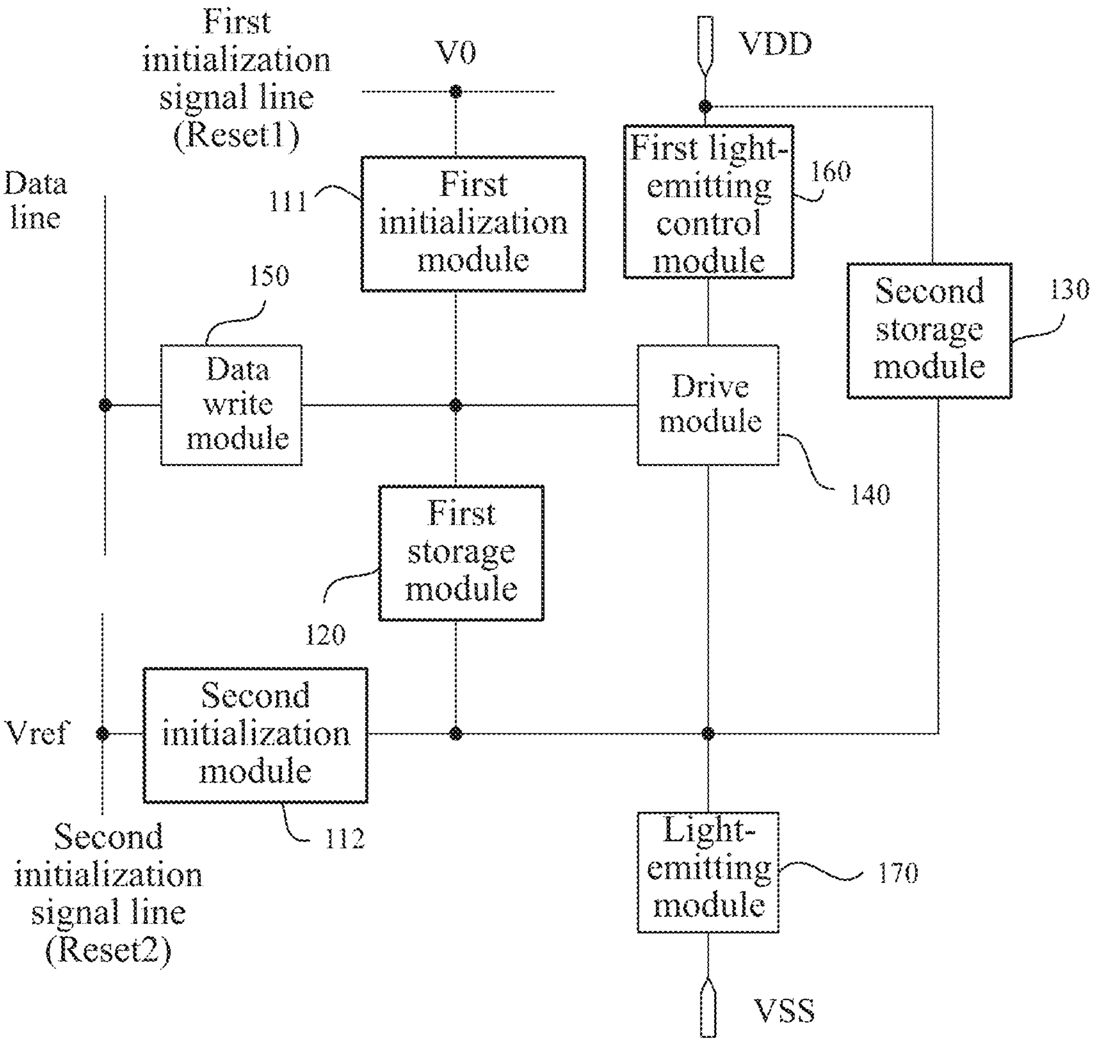
FIG. 2 is a schematic structural diagram of another pixel circuit according to an embodiment of the present application.
Figure 3:
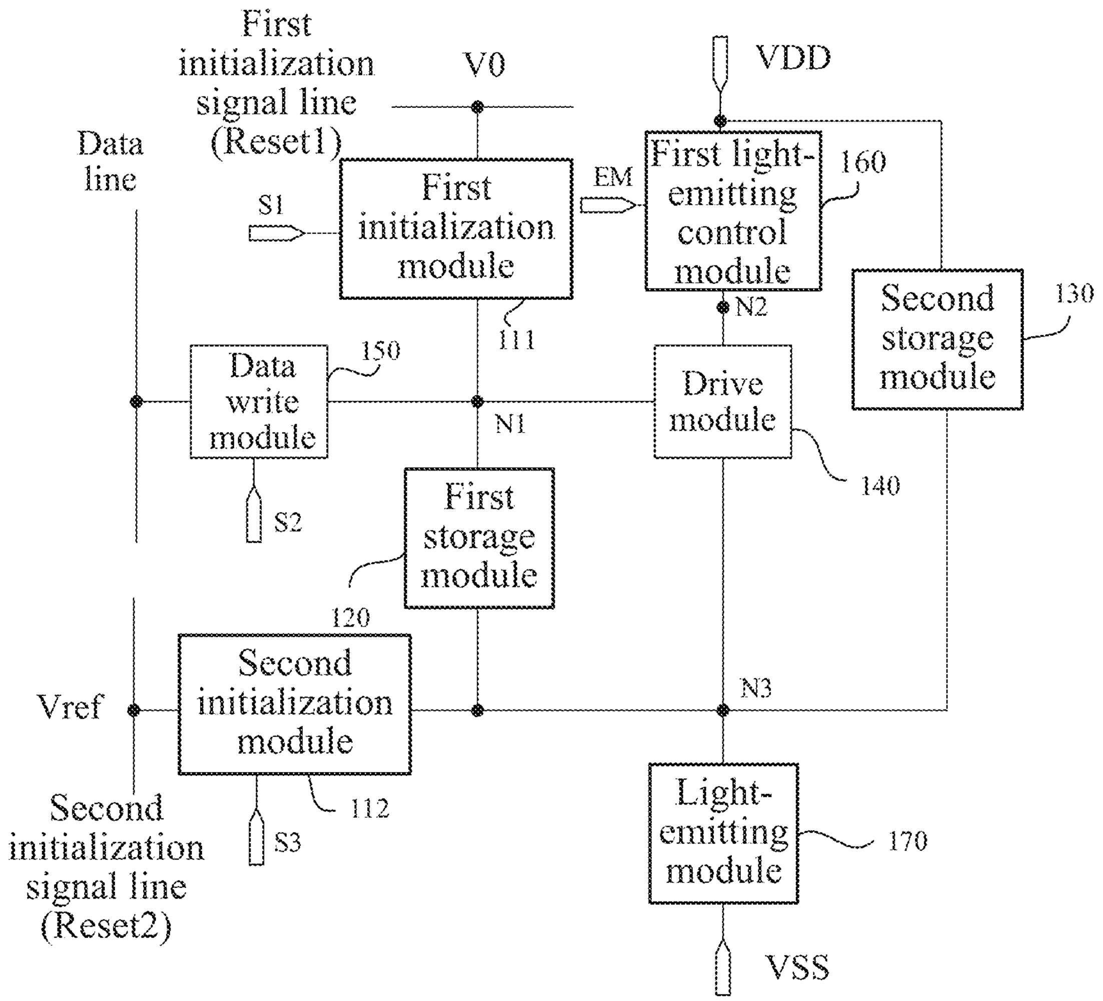
FIG. 3 is a schematic structural diagram of another pixel circuit according to an embodiment of the present application.

Optionally, initialization of the control terminal of the drive module 140 and initialization of the light-emitting module 170 may be implemented by using two different paths. FIG. 2 is a schematic structural diagram of another pixel circuit according to an embodiment of the present application. FIG. 3 is a schematic structural diagram of another pixel circuit according to an embodiment of the present application. Referring to FIG. 2 and FIG. 3, on the basis of the above-described technical schemes, the initialization module 110 includes a first initialization module 111 and a second initialization module 112.

The first initialization module 111 is connected between the control terminal of the drive module 140 and a first initialization signal line Reset1, and the first initialization module 111 is configured to transmit a first initialization voltage V0 provided by the first initialization signal line Reset1 to the control terminal of the drive module 140 after the first initialization module 111 is switched on.

The second initialization module 112 is connected between a first terminal of the light-emitting module 170 and a second initialization signal line Reset2, a second terminal of the light-emitting module 170 is connected to the second power supply VSS, and the second initialization module 112 is configured to transmit a second initialization voltage Vref provided by the second initialization signal line Reset2 to the first terminal of the light-emitting module 170 after the second initialization module 112 is switched on.

Further, referring to FIG. 3, a control terminal of the first initialization module 111 is connected to a first scan line S1, a first terminal of the first initialization module 111 is connected to the first initialization signal line Reset1, and a second terminal of the first initialization module 111 is connected to the control terminal of the drive module 140.

A control terminal of the data write module 150 is connected to a second scan line S2, a first terminal of the data write module 150 is connected to the data line Data, and a second terminal of the data write module 150 is connected to the control terminal of the drive module 140.

A control terminal of the second initialization module 112 is connected to a third scan line S3, a first terminal of the second initialization module 112 is connected to the second initialization signal line Reset2, and a second terminal of the second initialization module 112 is connected to the first terminal of the light-emitting module 170.

A control terminal of the first light-emitting control module 160 is connected to a light-emitting control signal line EM, a first terminal of the first light-emitting control module 160 is connected to the first power supply VDD, a second terminal of the first light-emitting control module 160 is connected to the first terminal of the drive module 140, and the second terminal of the drive module 140 is connected to the first terminal of the light-emitting module 170.

A first terminal of the first storage module 120 is connected to the control terminal of the drive module 140, and a second terminal of the first storage module 120 is connected to the second terminal of the drive module 140.

A first terminal of the second storage module 130 is connected to the first power supply VDD, and a second terminal of the second storage module 130 is connected to the second terminal of the drive module 140.

It should be noted that, for ease of describing the technical scheme, in this embodiment, both the first power supply and the voltage output by the first power supply may be represented by VDD, both the second power supply and the voltage output by the second power supply may be represented by VSS, and both the scan line and the scan signal output by the scan line may be represented by the same reference numerals.

Figure 4:
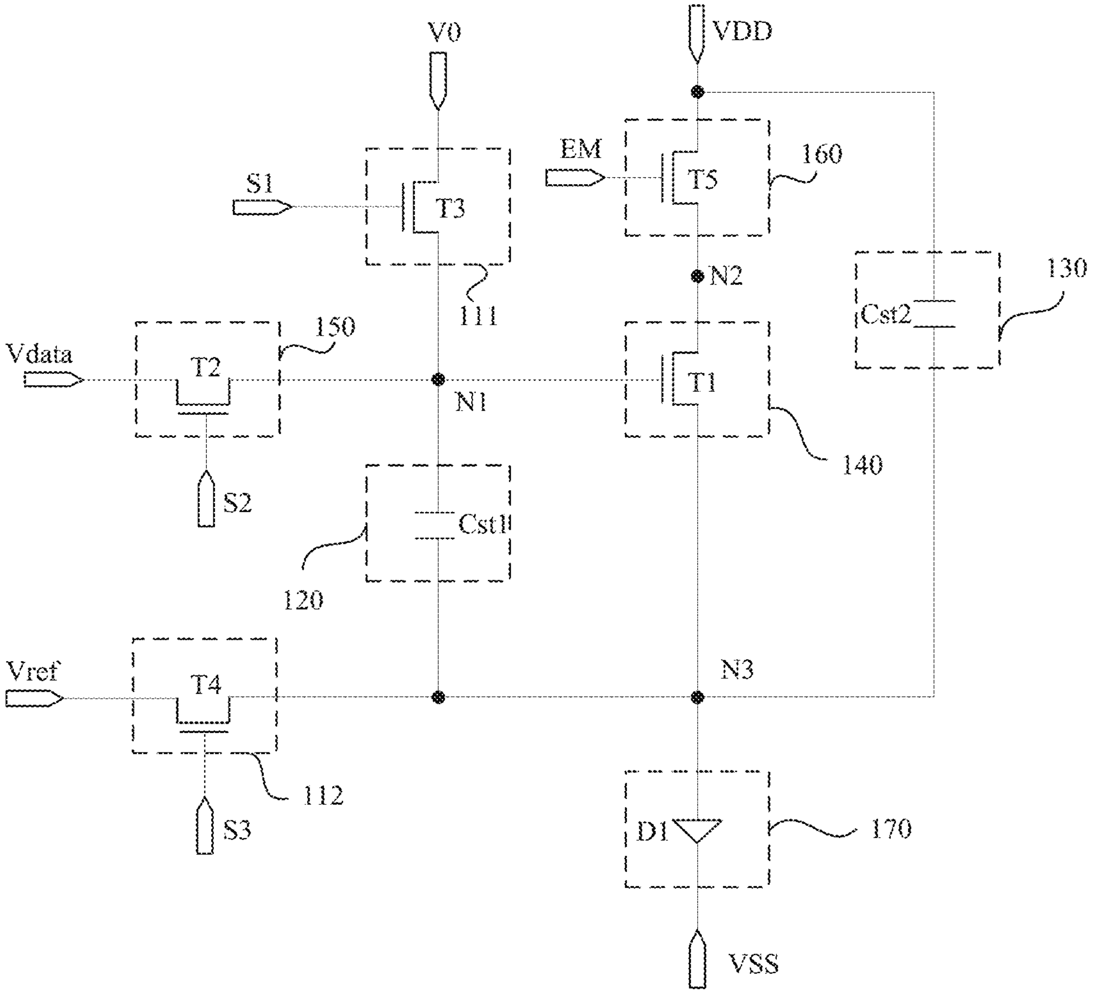
FIG. 4 is a schematic structural diagram of another pixel circuit according to an embodiment of the present application.

Further, FIG. 4 is a schematic structural diagram of another pixel circuit according to an embodiment of the present application, and may correspond to a specific schematic structural diagram of the pixel circuit shown in FIG. 3. Referring to FIG. 3 and FIG. 4, the drive module 140 includes a first transistor T1, the data write module 150 includes a second transistor T2, the first initialization module 111 includes a third transistor T3, the second initialization module 112 includes a fourth transistor T4, the first light-emitting control module 160 includes a fifth transistor T5, the first storage module 120 includes a first capacitor Cst1, the second storage module 130 includes a second capacitor Cst2, and the light-emitting module 170 includes a light-emitting diode D1.

A gate of the third transistor T3 is connected to the first scan line S1, a first pole of the third transistor T3 is connected to the first initialization signal line Reset1, a second pole of the third transistor T3 is connected to a gate of the first transistor T1, a first pole of the first transistor T1 is connected to a second pole of the fifth transistor T5, a first pole of the fifth transistor T5 is connected to the first power supply VDD, a gate of the fifth transistor T5 is connected to the light-emitting control signal line EM, a second pole of the first transistor T1 is connected to a first pole of the light-emitting diode D1, and a second pole of the light-emitting diode D2 is connected to the second power supply VSS.

A gate of the second transistor T2 is connected to the second scan line S2, a first pole of the second transistor T2 is connected to the data line Data, a second pole of the second transistor T2 is connected to the gate of the first transistor T1, a gate of the fourth transistor T4 is connected to the third scan line S3, a first pole of the fourth transistor T4 is connected to the second initialization signal line Reset2, and a second pole of the fourth transistor T4 is connected to the second pole of the first transistor T1.

A first terminal of the first capacitor Cst1 is connected to the gate of the first transistor T1, a second terminal of the first capacitor Cst1 is connected to the second pole of the first transistor T1, a first terminal of the second capacitor Cst2 is connected to the first power supply VDD, and a second terminal of the second capacitor Cst2 is connected to the second pole of the first transistor T1.

Figure 5:
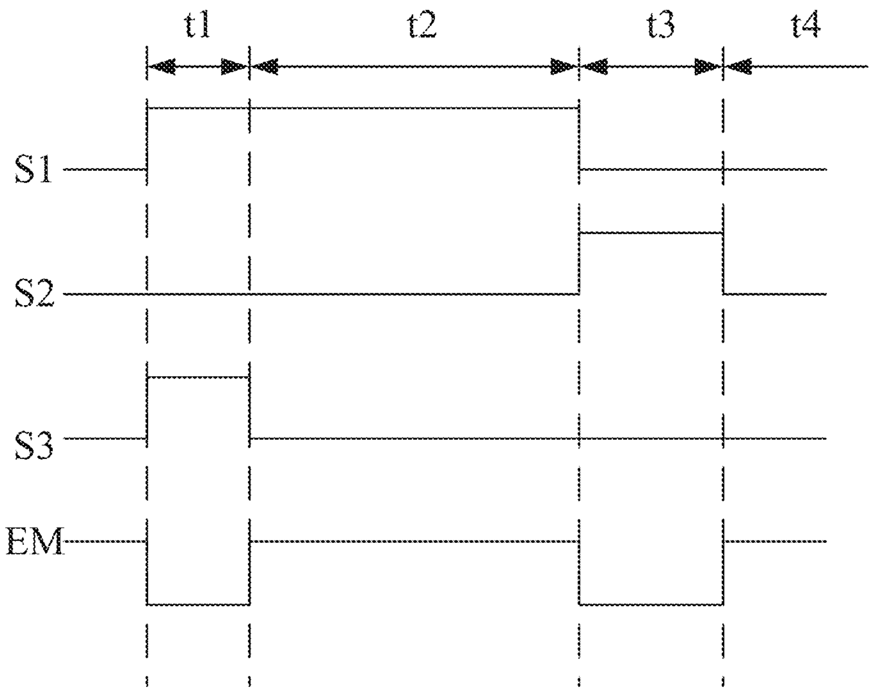
FIG. 5 is a drive timing diagram of a pixel circuit according to an embodiment of the present application.

As shown in FIG. 4, transistors T1~T5 are all N-type transistors. FIG. 5 is a drive timing diagram of a pixel circuit according to an embodiment of the present application, and is applicable to the pixel circuit shown in FIG. 4. With reference to FIG. 4 and FIG. 5, a working process of the pixel circuit provided in the embodiments of the present application includes an initialization stage t1, a compensation stage t2, a data write stage t3, and a light-emitting stage t4.

In the initialization stage t1, a signal output by the first scan line S1 is a high level, a signal output by the second scan line S2 is a low level, a signal output by the third scan line S3 is a high level, and a signal output by the light-emitting control signal line EM is a low level. Therefore, the third transistor T3 and the fourth transistor T4 are switched on, and the second transistor T2 and the fifth transistor T5 are switched off. The first initialization voltage V0 output by the first initialization signal line Reset1 is written to the gate of the first transistor T1 and the first terminal of the first capacitor Cst1, to initialize a potential of the gate of the first transistor T1. The second initialization voltage Vref output by the second initialization signal line Reset2 is written to the first pole of the light-emitting diode D1 and the second terminal of the first capacitor Cst1, to initialize a potential of the first pole of the light-emitting diode D1. In this stage, a voltage of the first node N1 is VN1=V0, and a voltage of the third node N3 is VN3=Vref.

In this embodiment, the second initialization voltage Vref is less than the first initialization voltage V0, and the first initialization voltage V0 is less than a turn-on voltage of the light-emitting diode D1, so as to ensure that the light-emitting diode D1 does not emit light in the initialization stage. In addition, since the first transistor T1 is the N-type transistor, the second initialization voltage Vref is set to be less than the first initialization voltage V0, so that a voltage difference (that is, a gate source voltage of the first transistor T1) between the gate of the first transistor T1 and the second pole of the first transistor T1 is a positive voltage, which is conductive to switching on the first transistor T1.

In the compensation stage t2, a signal output by the first scan line S1 is a high level, a signal output by the second scan line S2 is a low level, a signal output by the third scan line S3 is a low level, and a signal output by the light-emitting control signal line EM is a high level. Therefore, the third transistor T3 and the fifth transistor T5 are switched on, and the second transistor T2 and the fourth transistor T4 are switched off. Since the first transistor T1 is in an on state, the first power supply VDD charges the third node N3, so that the voltage of the third node N3 gradually increases from the Vref. Since the third transistor T3 is continuously switched on, the potential of the gate of the first transistor T1 is continuously the first initialization voltage V0. Therefore, when the voltage of the third node N3 (that is, a voltage of the second pole of the first transistor T1) rises to (V0−Vth), the first transistor T1 is switched off, where Vth is a threshold voltage of the first transistor T1. When the first transistor T1 is switched off, a potential of the third node N3 is stored in the first capacitor Cst1.

Further, in the compensation stage t2, the voltage of the third node N3 may be ensured to rise to (V0−Vth) by controlling the switch-on times of the third transistor T3 and the fifth transistor T5, so as to avoid the problem of incomplete compensation.

In the data write stage t3, a signal output by the first scan line S1 is a low level, a signal output by the second scan line S2 is a high level, a signal output by the third scan line S3 is a low level, and a signal output by the light-emitting control signal line EM is a low level. Therefore, the third transistor T3, the fourth transistor T4 and the fifth transistor T5 are switched off, and the second transistor T2 is switched on. The data voltage Vdata on the data line Data is written to the gate of the first transistor T1 through the second transistor T2. Due to the coupling action of the first capacitor Cst1, voltage change amounts at two ends of the first capacitor Cst1 are the same (the charge is conserved), and thus, the voltage change amount (Vdata−V0) at the first node N1 is coupled to the third node N3 by using the first capacitor Cst1. Since the third node N3 is connected between the first capacitor Cst1 and the second capacitor Cst2, the voltage change amount of the third node N3 is related to a capacitance value of the first capacitor Cst1 and a capacitance value of the second capacitor Cst2, and the voltage of the third node N3 may be specifically represented as VN3=V0−Vth+a(Vdata−V0), where a=c1/(c1+c2), c1 is the capacitance value of the first capacitor Cst1, and c2 is the capacitance value of the second capacitor Cst2.

In the light-emitting stage t4, a signal output by the first scan line S1 is a low level, a signal output by the second scan line S2 is a low level, a signal output by the third scan line S3 is a low level, and a signal output by the light-emitting control signal line EM is a high level. Therefore, the second transistor T2, the third transistor T3 and the fourth transistor T4 are switched off, and the fifth transistor T5 is switched on. The first transistor T1 generates a drive current I to drive the light-emitting diode D1 to emit light. The drive current may be represented as:

$$\begin{aligned} I &= \frac{1}{2}\mu C_{ox}\frac{W}{L}(Vgs - Vth)^2 \\ &= \frac{1}{2}\mu C_{ox}\frac{W}{L}(VN1 - VN3 - Vth)^2 \\ &= \frac{1}{2}\mu C_{ox}\frac{W}{L}[Vdata - (V0 - Vth + aVdata - aV0) - Vth]^2 \\ &= \frac{1}{2}\mu C_{ox}\frac{W}{L}[(1-a)(Vdata - V0)]^2 \circ \end{aligned}$$

Where μ is an electron mobility of the first transistor T1, Cox is a channel capacitor of a unit area of the first transistor T1, and W/L is a width-to-length ratio of the first transistor T1.

It may be learned from the foregoing formula that a light-emitting current of the light-emitting diode D1 is related to the data voltage Vdata and the first initialization voltage V0, and is not affected by the second power supply voltage VSS. Therefore, the IR drop (power supply voltage drop) of the second power supply VSS may be compensated. In addition, the light-emitting current is also not affected by the change in the cross-voltage voltage caused by the aging of the light-emitting diode D1, and the influence of the aging of the light-emitting diode D1 on the light-emitting current may be compensated.

Figure 6:
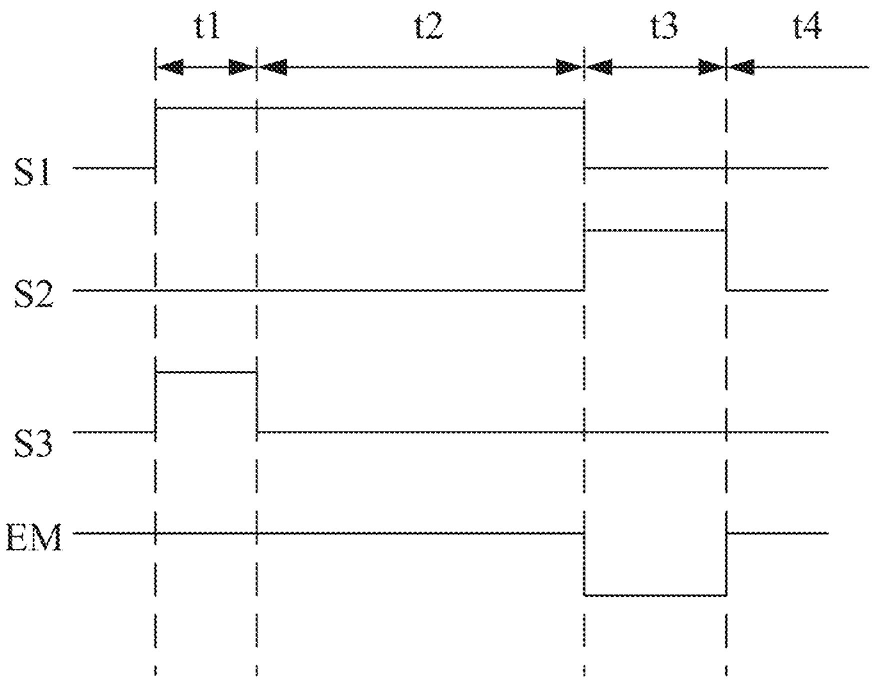
FIG. 6 is a drive timing diagram of another pixel circuit according to an embodiment of the present application.

FIG. 6 is a drive timing diagram of another pixel circuit according to an embodiment of the present application, and is also applicable to the pixel circuit shown in FIG. 4. A difference between the driving timings shown in FIG. 6 and FIG. 5 is that the state of the fifth transistor T5 shown in FIG. 6 is different from the state of the fifth transistor T5 shown in FIG. 6. For the driving timing shown in FIG. 5, the fifth transistor T5 is switched off in the initialization stage t1. For the driving timing shown in FIG. 6, the fifth transistor T5 is switched on in the initialization stage t1.

In this embodiment, in the initialization stage t1, a signal output by the first scan line S1 is a high level, a signal output by the second scan line S2 is a low level, a signal output by the third scan line S3 is a high level, and a signal output by the light-emitting control signal line EM is a high level. Therefore, the third transistor T3, the fourth transistor T4 and the fifth transistor T5 are switched on, and the second transistor T2 is switched off. Since the fifth transistor T5 is switched on, a channel is formed between the first power supply VDD, the fifth transistor T5, the first transistor T1, the fourth transistor T4 and the second initialization signal line, a large current flows through the first transistor T1, which can improve the hysteresis phenomenon of the first transistor T1 in the display picture of the previous frame due to different bias voltages, thereby facilitating the further improvement of the uniformity of the display picture.

A working process in other stages is the same as the working process of the driving timing shown in FIG. 5, which will not be described in detail here.

Figure 7:
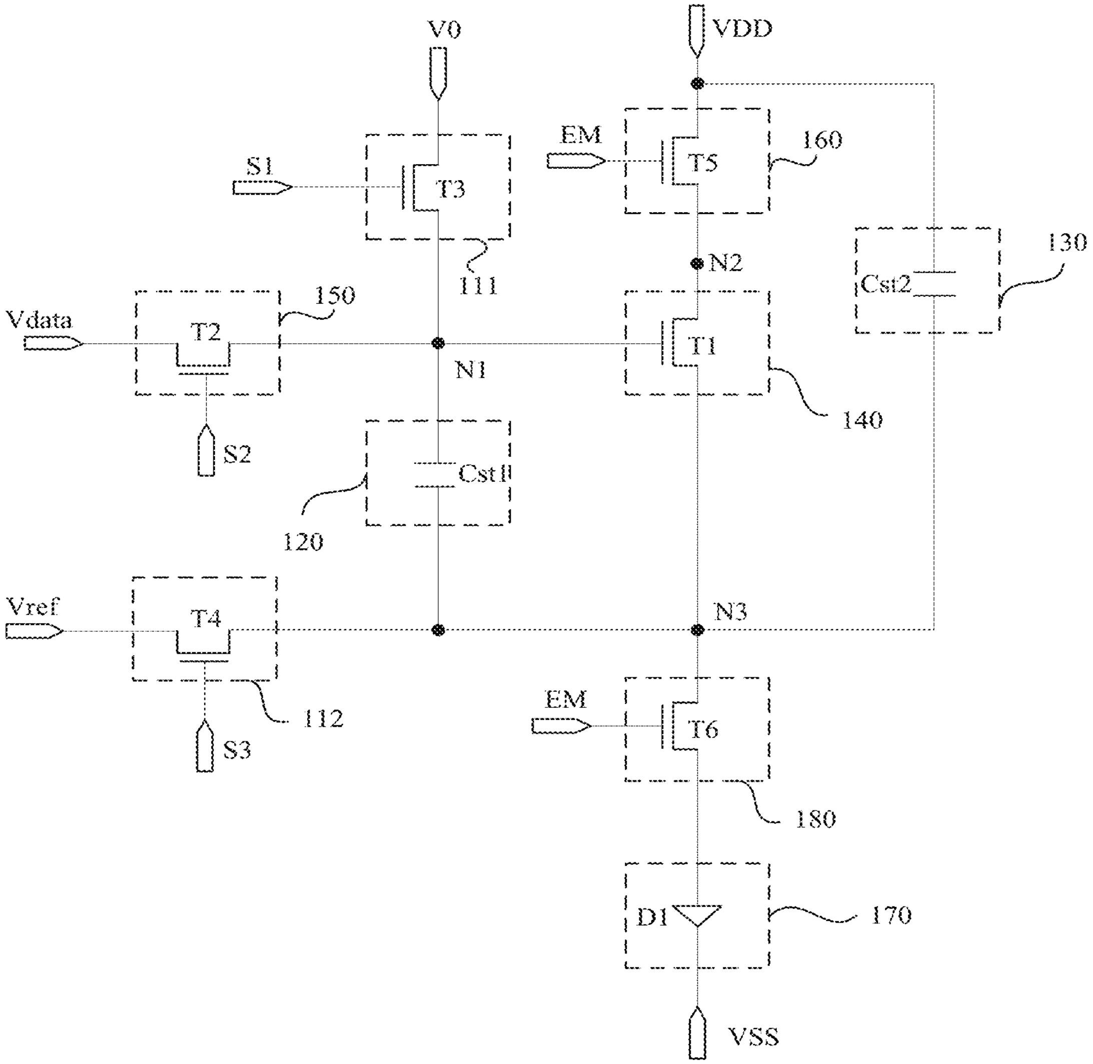
FIG. 7 is a schematic structural diagram of another pixel circuit according to an embodiment of the present application.

Optionally, FIG. 7 is a schematic structural diagram of another pixel circuit according to an embodiment of the present application. Referring to FIG. 7, on the basis of the above-described technical schemes, the pixel circuit provided in the embodiment of the present application further includes a second light-emitting control module 180, and the second light-emitting control module 180 includes a sixth transistor T6. A gate of the sixth transistor T6 is connected to the light-emitting control signal line EM, a first pole of the sixth transistor T6 is connected to the second pole of the first transistor T1, and a second pole of the sixth transistor T6 is connected to the first pole of the light-emitting diode D1.

Specifically, in this embodiment, the second light-emitting control module 180 and the first light-emitting control module 160 are connected to a same light-emitting control signal line EM. In the light-emitting stage t4, the fifth transistor T5 and the sixth transistor T6 are configured to jointly control the light-emitting diode D1 to emit light. The sixth transistor T6 does not affect working processes of the initialization stage t1, the compensation stage t2 and the data write stage t3. That is, driving timings of the pixel circuits shown in FIG. 5 and FIG. 6 are also applicable to the pixel circuit shown in FIG. 7, and specific working processes thereof may be referred to the relevant descriptions in the above-described embodiments, which will not be described in detail herein.

Figure 8:
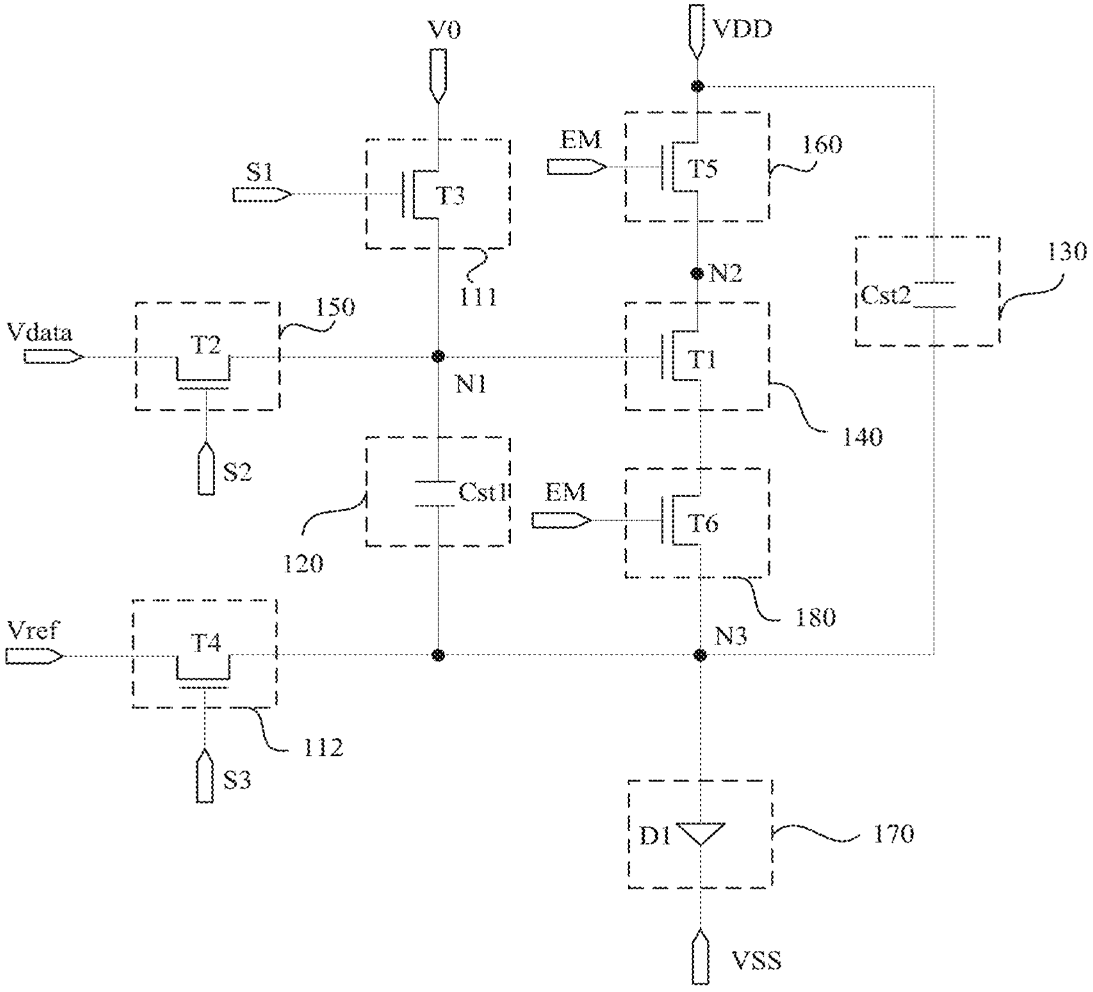
FIG. 8 is a schematic structural diagram of another pixel circuit according to an embodiment of the present application.

Of course, in other embodiments, a setting position of the second light-emitting control module 180 may be changed. FIG. 8 is a schematic structural diagram of another pixel circuit according to an embodiment of the present application. Referring to FIG. 8, the pixel circuit provided in the embodiment of the present application further includes a second light-emitting control module 180, and the second light-emitting control module 180 includes a sixth transistor T6. A gate of the sixth transistor T6 is connected to the light-emitting control signal line EM, and the second terminal of the first capacitor Cst1 is connected to the second pole of the first transistor T1 through the sixth transistor T6, and a working process thereof is not changed.

Figure 9:
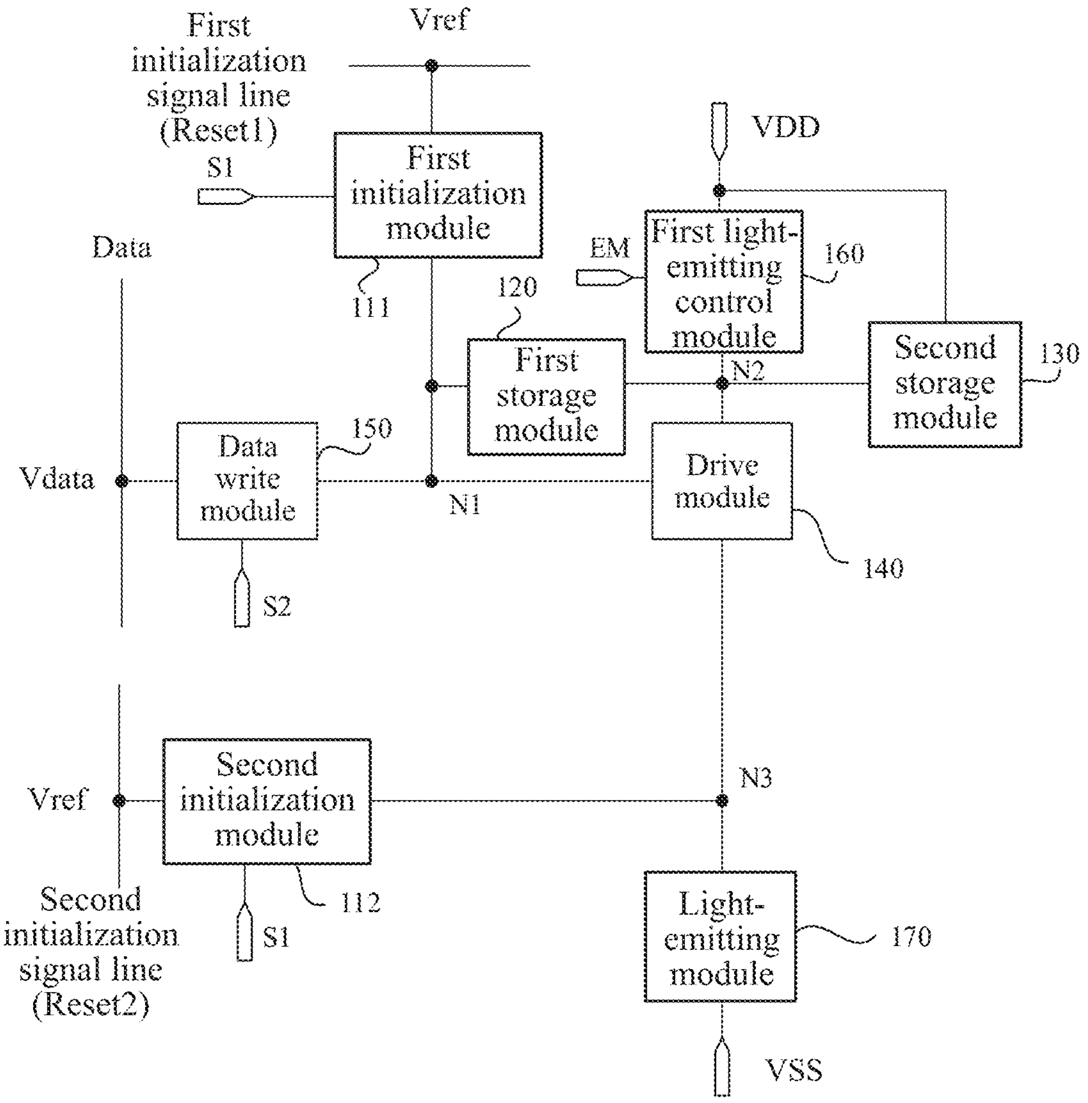
FIG. 9 is a schematic structural diagram of another pixel circuit according to an embodiment of the present application.
Figure 10:
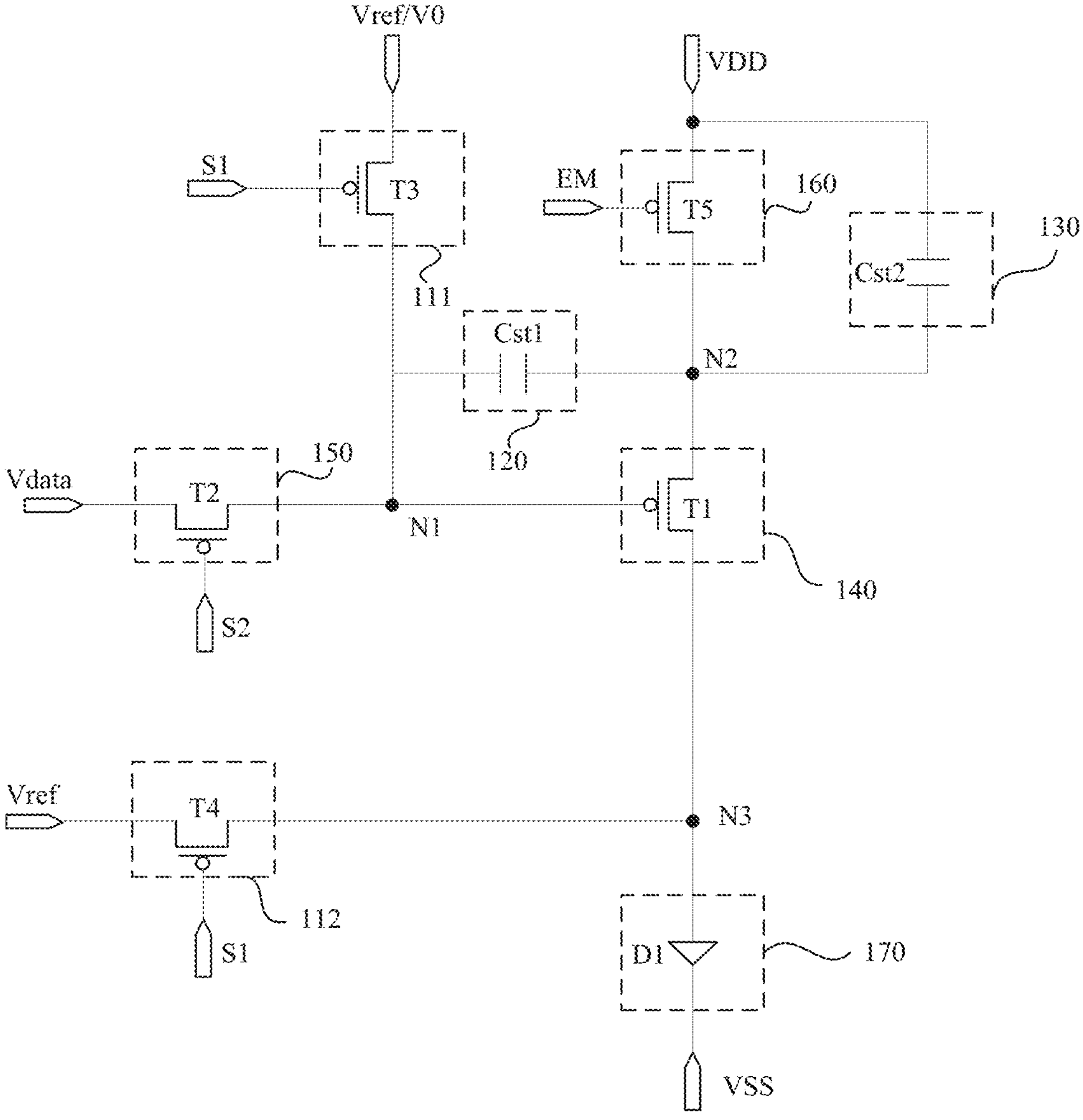
FIG. 10 is a schematic structural diagram of another pixel circuit according to an embodiment of the present application.

In another optional implementation mode provided in the embodiment of the present application, each of types of the above-described transistors may be a P-type transistor. FIG. 9 is a schematic structural diagram of another pixel circuit according to an embodiment of the present application. FIG. 10 is a schematic structural diagram of another pixel circuit according to an embodiment of the present application, and may correspond to a specific structure of the pixel circuit shown in FIG. 9. Referring to FIG. 9 and FIG. 10, a control terminal of the first initialization module 111 is connected to a first scan line S1, a first terminal of the first initialization module 111 is connected to the first initialization signal line Reset1, and a second terminal of the first initialization module 111 is connected to the control terminal of the drive module 140.

A control terminal of the data write module 150 is connected to a second scan line S2, a first terminal of the data write module 150 is connected to the data line Data, and a second terminal of the data write module 150 is connected to the control terminal of the drive module 140.

A control terminal of the second initialization module 112 is connected to the first scan line S1, a first terminal of the second initialization module 112 is connected to the second initialization signal line Reset2, and a second terminal of the second initialization module 112 is connected to the first terminal of the light-emitting module 170.

A control terminal of the first light-emitting control module 160 is connected to a light-emitting control signal line EM, a first terminal of the first light-emitting control module 160 is connected to the first power supply VDD, a second terminal of the first light-emitting control module 160 is connected to the first terminal of the drive module 140, and the second terminal of the drive module 140 is connected to the first terminal of the light-emitting module 170.

A first terminal of the first storage module 120 is connected to the control terminal of the drive module 140, and a second terminal of the first storage module 120 is connected to the first terminal of the drive module 140.

A first terminal of the second storage module 130 is connected to the first power supply VDD, and a second terminal of the second storage module 130 is connected to the first terminal of the drive module 140.

Further, with continued reference to FIG. 9 and FIG. 10, the drive module 140 includes a first transistor T1, the data write module 150 includes a second transistor T2, the first initialization module 111 includes a third transistor T3, the second initialization module 112 includes a fourth transistor T4, the first light-emitting control module 160 includes a fifth transistor T5, the first storage module 120 includes a first capacitor Cst1, the second storage module 130 includes a second capacitor Cst2, and the light-emitting module 170 includes a light-emitting diode D1.

A gate of the third transistor T3 is connected to the first scan line S1, a first pole of the third transistor T3 is connected to the first initialization signal line Reset1, a second pole of the third transistor T3 is connected to a gate of the first transistor T1, a first pole of the first transistor T1 is connected to a second pole of the fifth transistor T5, a first pole of the fifth transistor T5 is connected to the first power supply VDD, a gate of the fifth transistor T5 is connected to the light-emitting control signal line EM, a second pole of the first transistor T1 is connected to a first pole of the light-emitting diode D1, and a second pole of the light-emitting diode D1 is connected to the second power supply VSS.

A gate of the second transistor T2 is connected to the second scan line S2, a first pole of the second transistor T2 is connected to the data line Data, a second pole of the second transistor T2 is connected to the gate of the first transistor T1, a gate of the fourth transistor T4 is connected to the first scan line S1, a first pole of the fourth transistor T4 is connected to the second initialization signal line Reset2, and a second pole of the fourth transistor T4 is connected to the second pole of the first transistor T1.

A first terminal of the first capacitor Cst1 is connected to the gate of the first transistor T1, a second terminal of the first capacitor Cst1 is connected to the first pole of the first transistor T1, a first terminal of the second capacitor Cst2 is connected to the first power supply VDD, and a second terminal of the second capacitor Cst2 is connected to the first pole of the first transistor T1.

Figure 11:
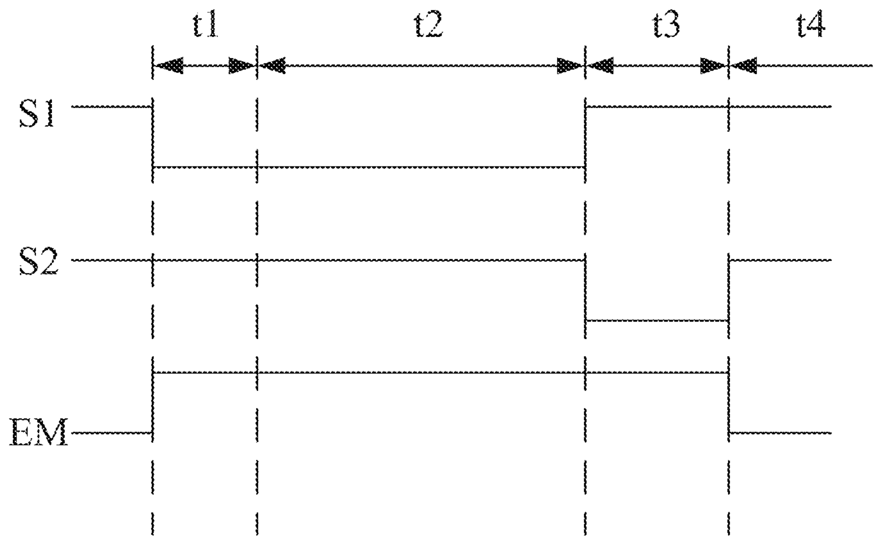
FIG. 11 is a drive timing diagram of another pixel circuit according to an embodiment of the present application.

As shown in FIG. 10, transistors T1~T5 are all P-type transistors. FIG. 11 is a drive timing diagram of another pixel circuit according to an embodiment of the present application, and is applicable to the pixel circuit shown in FIG. 10. With reference to FIG. 10 and FIG. 11, a working process of the pixel circuit provided in the embodiments of the present application includes an initialization stage t1, a compensation stage t2, a data write stage t3 and a lighting stage t4.

In the initialization stage t1, a signal output by the first scan line S1 is a low level, a signal output by the second scan line S2 is a high level, and a signal output by the light-emitting control signal line EM is a high level. Therefore, the third transistor T3 and the fourth transistor T4 are switched on, and the second transistor T2 and the fifth transistor T5 are switched off. The first initialization voltage V0 output by the first initialization signal line Reset1 is written to the gate of the first transistor T1 and the first terminal of the first capacitor Cst1, to initialize a potential of the gate of the first transistor T1. The second initialization voltage Vref output by the second initialization signal line Reset2 is written to the first pole of the light-emitting diode D1 and the second terminal of the first capacitor Cst1, to initialize a potential of the first pole of the light-emitting diode D1.

In this embodiment, since the first transistor T1 is the P-type transistor, and a gate source voltage of the first transistor T1 is a voltage between the gate and the first pole (that is, between the first node N1 and the second node N2), the third transistor T3 and the fourth transistor T4 may be controlled by a same scan signal. In addition, the first initialization voltage V0 is equal to the second initialization voltage Vref, and the first initialization voltage V0 is less than the voltage provided by the second power supply VSS, so as to ensure that the light-emitting diode D1 does not emit light. Therefore, in the initialization stage t1, a voltage of the first node N1 is VN1=V0=Vref, an initial voltage of the second node N2 is VN2=VDD, and a voltage of the third node N3 is VN2=VDD. Since the first initialization voltage V0 is less than the voltage provided by the second power supply VSS, a voltage between the first node N1 and the second node N2 is a negative value, which is conductive to switching on the first transistor T1.

In the compensation stage t2, a signal output by the first scan line S1 is a low level, a signal output by the second scan line S2 is a high level, and a signal output by the light-emitting control signal line EM is a high level, and a control timing of the compensation stage t2 is the same as the control timing of the initialization stage t1. Therefore, the third transistor T3 and the fourth transistor T4 are switched on, and the second transistor T2 and the fifth transistor T5 are switched off. Since the fifth transistor T5 is switched off, a voltage of the second node N2 gradually decreases from the VDD. Since the third transistor T3 is continuously switched on, the potential of the gate of the first transistor T1 is continuously the first initialization voltage V0 (V0=Vref). Therefore, when the voltage of the second node N2 (that is, a voltage of a first pole of the first transistor T1) decreases to (Vref−Vth), the first transistor T1 is switched off, where Vth is a threshold voltage of the first transistor T1. When the first transistor T1 is switched off, a potential of the second node N2 is stored in the first capacitor Cst1.

Further, in the compensation stage t2, the second transistor T2 is in the off state, so that there is no influence between the data write and the threshold compensation, thereby the compensation time in a threshold compensation process is adjustable, the threshold compensation may be performed on the first transistor T1 in a large range of fluctuation in the threshold voltage of the first transistor T1, and thus the uniformity of the display picture is improved.

In the data write stage t3, a signal output by the first scan line S1 is a high level, a signal output by the second scan line S2 is a low level, and a signal output by the light-emitting control signal line EM is a high level. Therefore, the third transistor T3, the fourth transistor T4 and the fifth transistor T5 are switched off, and the second transistor T2 is switched on. The data voltage Vdata on the data line Data is written to the gate of the first transistor T1 through the second transistor T2. Due to the coupling action of the first capacitor Cst1, voltage change amounts at two ends of the first capacitor Cst1 are the same (the charge is conserved), and thus, the voltage change amount (Vdata−Vref) at the first node N1 is coupled to the second node N2 by using the first capacitor Cst1. Since the second node N2 is connected between the first capacitor Cst1 and the second capacitor Cst2, the voltage change amount of the second node N2 is related to a capacitance value of the first capacitor Cst1 and a capacitance value of the second capacitor Cst2, and the voltage of the second node N2 may be specifically represented as VN2=Vref−Vth+a(Vdata−Vref), where a=c1/(c1+c2), c1 is the capacitance value of the first capacitor Cst1, and c2 is the capacitance value of the second capacitor Cst2.

In the light-emitting stage t4, a signal output by the first scan line S1 is a high level, a signal output by the second scan line S2 is a high level, and a signal output by the light-emitting control signal line EM is a low level. Therefore, the second transistor T2, the third transistor T3 and the fourth transistor T4 are switched off, and the fifth transistor T5 is switched on. The potential of the second node N2 jumps from Vref−Vth+a(Vdata−Vref) to VDD. Due to the coupling action of the first capacitor Cst1, the potential of the first node N1 jumps to Vdata+VDD−Vref+Vth−a (Vdata−Vref), and the first transistor T1 generates a drive current I to drive the light-emitting diode D1 to emit light. The drive current may be represented as:

$$
\begin{aligned}
I &= \frac{1}{2}\mu C_{ox}\frac{W}{L}(Vgs - Vth)^2 \\
&= \frac{1}{2}\mu C_{ox}\frac{W}{L}(VN1 - VN2 - Vth)^2 \\
&= \frac{1}{2}\mu C_{ox}\frac{W}{L}[Vdata - Vref + Vth - a(Vdata - Vref) - Vth]^2 \\
&= \frac{1}{2}\mu C_{ox}\frac{W}{L}[(1 - a)(Vdata - Vref)]^2\circ
\end{aligned}
$$

Where μ is an electron mobility of the first transistor T1, Cox is a channel capacitor of a unit area of the first transistor T1, and W/L is a width-to-length ratio of the first transistor T1.

It may be learned from the foregoing formula that a light-emitting current of the light-emitting diode D1 is related to the data voltage Vdata and the initialization voltage Vref, and is not affected by the second power supply voltage VSS. Therefore, the IR drop of the second power supply VSS may be compensated. In addition, the light-emitting current is also not affected by the change in the cross-voltage voltage caused by the aging of the light-emitting diode D1, and the influence of the aging of the light-emitting diode D1 on the light-emitting current may be compensated.

Optionally, FIG. 12 is a schematic structural diagram of another pixel circuit according to an embodiment of the present application. Referring to FIG. 12, on the basis of the above-described technical schemes, the pixel circuit provided in the embodiment of the present application further includes a second light-emitting control module 180, and the second light-emitting control module 180 includes a sixth transistor T6. A gate of the sixth transistor T6 is connected to the light-emitting control signal line EM, a first pole of the sixth transistor T6 is connected to the second pole of the first transistor T1, and a second pole of the sixth transistor T6 is connected to the first pole of the light-emitting diode D1.

Specifically, in this embodiment, the second light-emitting control module 180 and the first light-emitting control module 160 are connected to a same light-emitting control signal line EM. In the light-emitting stage t4, the fifth transistor T5 and the sixth transistor T6 are configured to jointly control the light-emitting diode D1 to emit light. The sixth transistor T6 does not affect working processes of the initialization stage t1, the compensation stage t2 and the data write stage t3, and specific working processes thereof may be referred to the relevant descriptions in the above-described embodiments, which will not be described in detail herein.

An embodiment of the present application further provides a driving method of a pixel circuit, and the driving method can drive the pixel circuit provided in any of the embodiments of the present application. FIG. 13 is a flowchart of a driving method of a pixel circuit according to an embodiment of the present application. Referring to FIG. 1 and FIG. 13, the pixel circuit includes an initialization module 110, a first storage module 120, a second storage module 130, a drive module 140, a data write module 150, a first light-emitting control module 160 and a light-emitting module 170. The first light-emitting control module 160 is connected between a first power supply VSS and a first terminal of the drive module 140, the data write module 150 is connected between a control terminal of the drive module 140 and a data line Data, the light-emitting module 170 is connected between a second terminal of the drive module 140 and a second power supply VSS, the first storage module 120 is connected to the control terminal of the drive module 140 and is configured to store a voltage of the control terminal of the drive module 140, and the second storage module 130 is configured to store a voltage of the first terminal of the drive module 140 or a voltage of the second terminal of the drive module 140.

The driving method of the pixel circuit provided in the embodiments of the present application includes steps described below.

In S110, in an initialization stage, an initialization voltage is written to the control terminal of the drive module and the light-emitting module by the initialization module to initialize the control terminal of the drive module and the light-emitting module, and the initialization voltage is continuously written to the control terminal of the drive module in a compensation stage.

Specifically, in the initialization stage, the initialization module 110 is switched on, and transmits the initialization voltage to each of the control terminal of the drive module 140 and the first terminal of the light-emitting module 170 to initialize a potential of the control terminal of the drive module 140 and a potential of the first terminal of the light-emitting module 170. In the compensation stage, the first light-emitting control module 160 is switched on, and a voltage output by the first power supply VDD is transmitted to the first terminal of the drive module 140. The drive module 140 is switched on, and a potential of the second terminal of the drive module 140 gradually increases from the initialization voltage. Since the initialization module 110 is configured to continuously write the initialization voltage to the control terminal of the drive module 140 in the compensation stage, when a potential of the second terminal of the drive module 140 rises to a difference between the initialization voltage and a threshold voltage of the drive module 140, the drive module 140 is switched off and the first storage module 120 stores the threshold voltage of the drive module 140. In the compensation stage, since the initialization module 110 is configured to continuously write the initialization voltage to the control terminal of the drive module 140, the data write module 150 is in an off state and cannot write a data voltage on the data line Data to the control terminal of the drive module 140. Therefore, a duration of the compensation stage is determined by a switch-on duration of the initialization module 110 and the first light-emitting control module 160, and is independent of a switch-on duration of the data write module 150. That is, initializing the control terminal of the drive module 140 and writing the data voltage to the control terminal of the drive module 140 are implemented through two independent paths, respectively, so that the data write stage and the compensation stage do not affect each other, and the initialization voltage is continuously written to the control terminal of the drive module 140 in the compensation stage. The compensation duration is adjusted by controlling switch-on durations of the initialization module 110 and the first light-emitting control module 160, so that a relatively large range of threshold voltage fluctuation may be compensated, and thus the threshold voltage is completely compensated.

In S120, in a data write stage, a data voltage provided by a data line is transmitted to a control terminal of the drive module by the data write module.

Specifically, in the data write stage, the data write module 150 is configured to write a data voltage Vdata on the data line Data to the control terminal of the drive module 140. In the compensation stage, since the first storage module 120 has stored the threshold voltage of the drive module 140, after the data voltage Vdata is written to the control terminal of the drive module 140, the voltage stored in the first storage module 120 is associated with the data voltage Vdata and the threshold voltage.

In contrast to the related art, according to the technical schemes provided in the embodiments of the present application, initializing the control terminal of the drive module and writing the data voltage to the control terminal of the drive module are implemented through two independent paths, respectively, so that the threshold compensation is performed before the data voltage is written to the control terminal of the drive module. It is precisely since initializing the control terminal of the drive module and writing the data voltage to the control terminal of the drive module are implemented by using different paths, and the initialization voltage is continuously written to the control terminal of the drive module in the compensation stage, so that the compensation stage and the data write stage do not affect each other, and thus the compensation time is adjustable. The fluctuation of a threshold voltage within the relatively large range can be compensated by adjusting the compensation time for the threshold voltage, so that the threshold voltage of the drive module is completely compensated, thereby reducing the difference of characteristics of drive modules corresponding to different pixels, and further improving the difference in the display brightness and improving the uniformity of the display picture quality.

Optionally, with reference to FIG. 3 to FIG. 5, the initialization module 110 includes a first initialization module 111 and a second initialization module 112. The first initialization module 111 is connected between the control terminal of the drive module 140 and a first initialization signal line Reset1, and the second initialization module 112 is connected between a first terminal of the light-emitting module 170 and a second initialization signal line Reset2. The drive module 140 includes a first transistor T1, the data write module 150 includes a second transistor T2, the first initialization module 111 includes a third transistor T3, the second initialization module 112 includes a fourth transistor T4, the first light-emitting control module 160 includes a fifth transistor T5, the first storage module 120 includes a first capacitor Cst1, the second storage module 130 includes a second capacitor Cst2, the light-emitting module 170 includes a light-emitting diode D1, and the transistors T1~T5 are all N-type transistors.

In the initialization stage t1, a first scan line S1 outputs a first scan signal of a high level, a second scan line S2 outputs a second scan signal of a low level, a third scan line S3 outputs a third scan signal of a high level, a light-emitting control signal line EM outputs a light-emitting control signal of a low level or a light-emitting control signal of a high level, so as to respectively control the first initialization module 111 and the second initialization module 112 to be switched on, control the data write module 150 to be switched off, and control the first light-emitting control module 160 to be switched on or switched off. A first initialization voltage V0 output by the first initialization signal line Reset1 is written to a gate of the first transistor T1 and a first terminal of the first capacitor Cst1 to initialize a potential of the gate of the first transistor T1. A second initialization voltage Vref output by the second initialization signal line Reset2 is written to a first pole of the light-emitting diode D1 and a second terminal of the first capacitor Cst1 to initialize a potential of the first pole of the light-emitting diode D1. In this stage, a voltage of the first node N1 is VN1=V0, and a voltage of the third node N3 is VN3=Vref.

In this embodiment, the second initialization voltage Vref is less than the first initialization voltage V0, and the first initialization voltage V0 is less than a turn-on voltage of the light-emitting diode D1, so as to ensure that the light-emitting diode D1 does not emit light in the initialization stage. In addition, since the first transistor T1 is the N-type transistor, the second initialization voltage Vref is set to be less than the first initialization voltage V0, so that a voltage difference (that is, a gate source voltage of the first transistor T1) between the gate of the first transistor T1 and the second pole of the first transistor T1 is a positive voltage, which is conductive to switching on the first transistor T1.

In the compensation stage t2, the first scan line S1 outputs a first scan signal of a high level, the second scan line S2 outputs a second scan signal of a low level, the third scan line S3 outputs a third scan signal of a low level, and the light-emitting control signal line EM outputs a light-emitting control signal of a high level, so as to respectively control the first initialization module 111 and the first light-emitting control module 160 to be switched on, and control the data write module 150 and the second initialization module 112 to be switched off. When the initialization stage t1 is finished, the drive module 140 is in the on state, and the first power supply VDD charges the third node N3, so that the voltage of the third node N3 gradually increases from the Vref. Since the first initialization module 111 is continuously switched on, and a potential of the control terminal of the drive module 140 is continuously the first initialization voltage V0. Therefore, when the voltage of the third node N3 rises to (V0−Vth), the first transistor T1 is switched off, where Vth is a threshold voltage of the first transistor T1. When the first transistor T1 is switched off, a potential of the third node N3 is stored in the first capacitor Cst1.

Further, in the compensation stage t2, the voltage of the third node N3 may be ensured to rise to (V0−Vth) by controlling the switch-on times of the first initialization module 111 and the first light-emitting control module 160, so as to avoid the problem of incomplete compensation.

In the data write stage t3, the first scan line S1 outputs a first scan signal of a low level, the second scan line S2 outputs a second scan signal of a high level, the third scan line S3 outputs a third scan signal of a low level, the light-emitting control signal line EM outputs a light-emitting control signal of a low level, so as to respectively control the data write module 150 to be switched on, and control the first initialization module 111, the second initialization module 112 and the first light-emitting control module 160 to be switched off. A data voltage Vdata on the data line Data is written to the gate of the first transistor T1 through the second transistor T2. Due to the coupling action of the first capacitor Cst1, voltage change amounts at two ends of the first capacitor Cst1 are the same (the charge is conserved), and thus, the voltage change amount (Vdata—V0) at the first node N1 is coupled to the third node N3 by using the first capacitor Cst1. Since the third node N3 is connected between the first capacitor Cst1 and the second capacitor Cst2, the voltage change amount of the third node N3 is related to a capacitance value of the first capacitor Cst1 and a capacitance value of the second capacitor Cst2, and the voltage of the third node N3 may be specifically represented as VN3=V0−Vth+a(Vdata−V0), where a=c1/(c1+c2), c1 is the capacitance value of the first capacitor Cst1, and c2 is the capacitance value of the second capacitor Cst2.

In the light-emitting stage t4, the first scan line S1 outputs a first scan signal of a low level, the second scan line S2 outputs a second scan signal of a low level, the third scan line S3 outputs a third scan signal of a low level, and the light-emitting control signal line EM outputs a light-emitting control signal of a high level, so as to respectively control the first light-emitting control module 160 to be switched on, and control the first initialization module 111, the second initialization module 112 and the data write module 150 to be switched off. The drive module 140 generates a drive current under a voltage of the control terminal of the drive module 140 and a voltage output by the first power supply VDD, so as to drive the light-emitting diode D1 to emit light.

In this embodiment, each of the first scan line S1, the second scan line S2, the third scan line S3 and the light-emitting control signal line EM is connected to a gate driver circuit, the data line Data is connected to a data driver circuit or a display driver chip, that is, each of the light-emitting control signal, the first scan signal, the second scan signal and the third scan signal may be output by the gate driver circuit, and the data signal may be output by the data driver circuit or the display driver chip.

Optionally, with reference to FIG. 9 to FIG. 11, the initialization module 110 includes a first initialization module 111 and a second initialization module 112. The first initialization module 111 is connected between the control terminal of the drive module 140 and a first initialization signal line Reset1, and the second initialization module 112 is connected between a first terminal of the light-emitting module 170 and a second initialization signal line Reset2.

In an initialization and compensation stage (t1+t2), the first initialization module 111 and the second initialization module 112 are controlled to be switched on, and the data write module 150 and the first light-emitting control module 160 are controlled to be switched off. In the data write stage t3, the data write module 150 is controlled to be switched on, and the first initialization module 111, the second initialization module 112, and the first light-emitting control module 160 are controlled to be switched off. In the light-emitting stage t4, the first light-emitting control module 160 is controlled to be switched on, and the first initialization module 111, the second initialization module 112, and the data write module 150 are controlled to be switched off.

The structure of the pixel circuit and the control timing of the pixel circuit shown in FIG. 9 to FIG. 11 are applicable to the pixel circuit of the P-type transistor, and specific working principle thereof refers to the relevant description in the embodiments of the pixel circuit, which will not described herein again.

Figure 14:
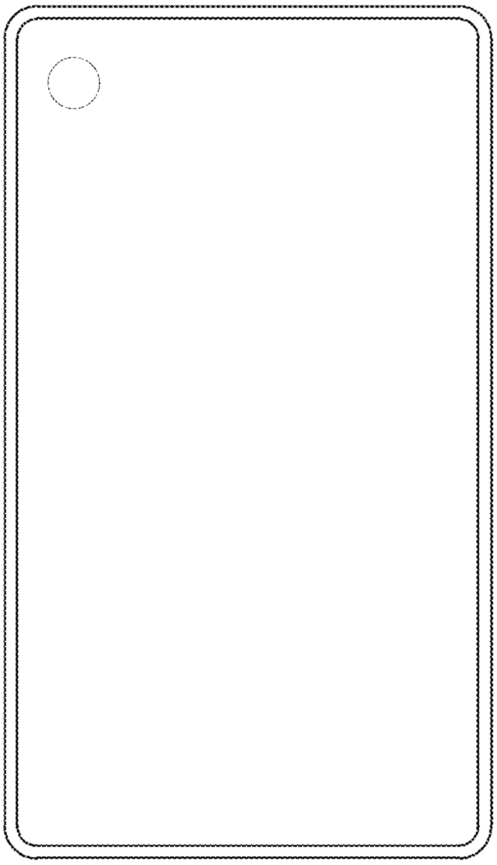
FIG. 14 is a schematic structural diagram of a display panel according to an embodiment of the present application.

Optionally, an embodiment of the present application further provides a display panel. The display panel includes the pixel circuit provided in any of the embodiments of the present application. Therefore, the display panel provided in the embodiments of the present application also has beneficial effects described in any of the above-described embodiments. FIG. 14 is a schematic structural diagram of a display panel according to an embodiment of the present application. Referring to FIG. 14, the display panel may be a mobile phone panel shown in FIG. 14, or may be a panel of any electronic product that has a display function, including but not limited to a television, a notebook computer, a desktop type display, a tablet computer, a digital camera, a smart band, smart glasses, an in-vehicle display, a medical device, an industrial control device, and a touch interaction terminal, which are not specifically limited in the embodiments of the present application.

It should be noted that the above-mentioned contents are switched only the preferred embodiments of the present application and the technical principles applied thereto. It is to be understood by those skilled in the art that the present application is not limited to the particular embodiments described herein, and that various variations, rearrangements and substitutions may be made without departing from the protection scope of the present application. Therefore, although the present application has been described in detail with reference to the above embodiments, the present application is not limited to the above embodiments, and may further include other more equivalent embodiments without departing from the concept of the present disclosure, and the scope of the present disclosure is defined by the scope of the appended claims.

What is claimed is:

1. A pixel circuit, comprising a drive module;

a first storage module, wherein the first storage module is connected to a control terminal of the drive module and is configured to store a voltage of the control terminal of the drive module;

a second storage module, wherein the second storage module is configured to store a voltage of a first terminal of the drive module or a voltage of a second terminal of the drive module;

a data write module connected between the control terminal of the drive module and a data line and configured to transmit a data voltage provided by the data line to the control terminal of the drive module in a data write stage;

a first light-emitting control module connected between a first power supply and a first terminal of the drive module and configured to transmit a voltage provided by the first power supply to the first terminal of the drive module after the first light-emitting control module is switched on; and a light-emitting module connected between a first power supply and a first terminal of the drive module and configured to transmit a voltage provided by the first power supply to the first terminal of the drive module after the first light-emitting control module is switched on; and an initialization module configured to:

write an initialization voltage to the control terminal of the drive module and the light-emitting module in an initialization stage to initialize the control terminal of the drive module and the light-emitting module, and continuously write the initialization voltage to the control terminal of the drive module in a compensation stage while the data write module is in an off state.

2. The pixel circuit of claim 1, wherein the initialization module further comprises:

a first initialization module connected between the control terminal of the drive module and a first initialization signal line and configured to transmit a first initialization voltage provided by the first initialization signal line to the control terminal of the drive module after the first initialization module is switched on; and a second initialization module connected between a first terminal of the light-emitting module and a second initialization signal line, wherein a second terminal of the light-emitting module is connected to the second power supply, and the second initialization module is configured to transmit a second initialization voltage provided by the second initialization signal line to the first terminal of the light-emitting module after the second initialization module is switched on.

3. The pixel circuit of claim 2, wherein a control terminal of the first initialization module is connected to a first scan line, a first terminal of the first initialization module is connected to the first initialization signal line, and a second terminal of the first initialization module is connected to the control terminal of the drive module;

a control terminal of the data write module is connected to a second scan line, a first terminal of the data write module is connected to the data line, and a second terminal of the data write module is connected to the control terminal of the drive module;

a control terminal of the second initialization module is connected to a third scan line or the first scan line, a first terminal of the second initialization module is connected to the second initialization signal line, and a second terminal of the second initialization module is connected to the first terminal of the light-emitting module;

a control terminal of the first light-emitting control module is connected to a light-emitting control signal line, a first terminal of the first light-emitting control module is connected to the first power supply, a second terminal of the first light-emitting control module is connected to the first terminal of the drive module, and the second terminal of the drive module is connected to the first terminal of the light-emitting module.

4. The pixel circuit of claim 3, wherein the drive module comprises a first transistor, the data write module comprises a second transistor, the first initialization module comprises a third transistor, the second initialization module comprises a fourth transistor, the first light-emitting control module comprises a fifth transistor, the first storage module comprises a first capacitor, the second storage module comprises a second capacitor, and the light-emitting module comprises a light-emitting diode;

a gate of the third transistor is connected to the first scan line, a first pole of the third transistor is connected to the first initialization signal line, a second pole of the third transistor is connected to a gate of the first transistor, a first pole of the first transistor is connected to a second pole of the fifth transistor, a first pole of the fifth transistor is connected to the first power supply, a gate of the fifth transistor is connected to the light-emitting control signal line, a second pole of the first transistor is connected to a first pole of the light-emitting diode, and a second pole of the light-emitting diode is connected to the second power supply;

a gate of the second transistor is connected to the second scan line, a first pole of the second transistor is connected to the data line, a second pole of the second transistor is connected to the gate of the first transistor, a gate of the fourth transistor is connected to the third scan line, a first pole of the fourth transistor is connected to the second initialization signal line, and a second pole of the fourth transistor is connected to the second pole of the first transistor; and a first terminal of the first capacitor is connected to the gate of the first transistor, a second terminal of the first capacitor is connected to the second pole of the first transistor, a first terminal of the second capacitor is connected to the first power supply, and a second terminal of the second capacitor is connected to the second pole of the first transistor.

5. The pixel circuit of claim 4, wherein the first transistor, the second transistor, the third transistor, the fourth transistor and the fifth transistor are N-type transistors.

6. The pixel circuit of claim 4, wherein the pixel circuit further comprises a second light-emitting control module comprising a sixth transistor, a gate of the sixth transistor is connected to the light-emitting control signal line, a first pole of the sixth transistor is connected to the second pole of the first transistor, a second pole of the sixth transistor is connected to the first pole of the light-emitting diode, and the second terminal of the first capacitor is connected to the second pole of the first transistor through the sixth transistor.

7. The pixel circuit of claim 3, wherein the second initialization voltage is less than the first initialization voltage, and the first initialization voltage is less than a turn-on voltage of the light-emitting diode.

8. The pixel circuit of claim 3, wherein in the initialization stage, the first light-emitting control module is configured to be switched off or switched on.

9. The pixel circuit of claim 3, wherein the drive module comprises a first transistor, the data write module comprises a second transistor, the first initialization module comprises a third transistor, the second initialization module comprises a fourth transistor, the first light-emitting control module comprises a fifth transistor, the first storage module comprises a first capacitor, the second storage module comprises a second capacitor, and the light-emitting module comprises a light-emitting diode;

a gate of the third transistor is connected to the first scan line, a first pole of the third transistor is connected to the first initialization signal line, a second pole of the third transistor is connected to a gate of the first transistor, a first pole of the first transistor is connected to a second pole of the fifth transistor, a first pole of the fifth transistor is connected to the first power supply, a gate of the fifth transistor is connected to the light-emitting control signal line, a second pole of the first transistor is connected to a first pole of the light-emitting diode, and a second pole of the light-emitting diode is connected to the second power supply;

a gate of the second transistor is connected to the second scan line, a first pole of the second transistor is connected to the data line, a second pole of the second transistor is connected to the gate of the first transistor, a gate of the fourth transistor is connected to the first scan line, a first pole of the fourth transistor is connected to the second initialization signal line, and a second pole of the fourth transistor is connected to the second pole of the first transistor;

a first terminal of the first capacitor is connected to the gate of the first transistor, a second terminal of the first capacitor is connected to the first pole of the first transistor, a first terminal of the second capacitor is connected to the first power supply, a second terminal of the second capacitor is connected to the first pole of the first transistor, and the pixel circuit further comprises:

a second light-emitting control module comprising a sixth transistor, a gate of the sixth transistor is connected to the light-emitting control signal line, a first pole of the sixth transistor is connected to the second pole of the first transistor, and a second pole of the sixth transistor is connected to the first pole of the light-emitting diode.

10. The pixel circuit of claim 9, wherein the first transistor, the second transistor, the third transistor, the fourth transistor and the fifth transistor are P-type transistors.

11. The pixel circuit of claim 3, wherein the first initialization voltage is equal to the second initialization voltage and the first initialization voltage is less than a voltage provided by the second power supply.

12. The pixel circuit of claim 1, wherein the first light-emitting control module is configured to transmit the voltage provided by the first power supply to the first terminal of the drive module in the compensation stage while the data write module is in an off state; the initialization voltage and the voltage provided by the first power supply jointly control the first storage module to store a threshold voltage of the driving module in the compensation stage; and the first light-emitting control module is configured to transmit the voltage provided by the first power supply to the first terminal of the drive module in a light-emitting stage to drive the drive module to generate a drive current under the control of the data voltage and the threshold voltage.

13. The pixel circuit of claim 1, wherein a first terminal of the first storage module is connected to the control terminal of the drive module, a first terminal of the second storage module is connected to the first power supply, and a second terminal of the first storage module and a second terminal of the second storage module are jointly connected to the first terminal or the second terminal of the drive module.

14. The pixel circuit of claim 13, wherein the data voltage is coupled to the first terminal or the second terminal of the drive module through the first storage module and the second storage module in the data write stage while the initialization module and the first light-emitting control module is in an off state; and a voltage of the first terminal or the second terminal of the drive module is related to the data voltage and a threshold voltage of the driving module after the data write stage is over.

15. A driving method of a pixel circuit, wherein the pixel circuit comprises;

a drive module, an initialization module, a first storage module connected to a control terminal of the drive module and configured to store a voltage of the control terminal of the drive module, a second storage module configured to store a voltage of a first terminal of the drive module or a voltage of a second terminal of the drive module, a data write module connected between the control terminal of the drive module and a data line, a first light-emitting control module connected between a first power supply and the first terminal of the drive module, and a light-emitting module connected between the second terminal of the drive module and a second power supply, wherein the driving method comprises:

writing, by the initialization module, an initialization voltage to the control terminal of the drive module and the light-emitting module in an initialization stage to initialize the control terminal of the drive module and the light-emitting module;

continuously writing, by the initialization module, the initialization voltage to the control terminal of the drive module in a compensation stage while the data write module is in an off state; and transmitting, by the data write module, a data voltage provided by the data line to the control terminal of the drive module in a data write stage.

16. The driving method of claim 15, wherein the initialization module comprises a first initialization module and a second initialization module, the first initialization module is connected between the control terminal of the drive module and a first initialization signal line, and the second initialization module is connected between a first terminal of the light-emitting module and a second initialization signal line; and the driving method further comprises:

controlling the first initialization module and the second initialization module to be switched on, controlling the data write module to be switched off, and controlling the first light-emitting control module to be switched on or switched off in the initialization stage;

controlling the first initialization module and the first light-emitting control module to be switched on, and controlling the data write module and the second initialization module to be switched off in the compensation stage;

controlling the data write module to be switched on, and controlling the first initialization module, the second initialization module and the first light-emitting control module to be switched off in the data write stage; and controlling the first light-emitting control module to be switched on, and controlling the first initialization module, the second initialization module and the data write module to be switched off in a light-emitting stage.

17. The driving method of claim 15, wherein the initialization module comprises a first initialization module and a second initialization module, the first initialization module is connected between the control terminal of the drive module and a first initialization signal line, and the second initialization module is connected between a first terminal of the light-emitting module and a second initialization signal line; and the driving method further comprises:

controlling the first initialization module and the second initialization module to be switched on, and controlling the data write module and the first light-emitting control module to be switched off in the initialization stage and the compensation stage;

controlling the data write module to be switched on, and controlling the first initialization module, the second initialization module and the first light-emitting control module to be switched off in the data write stage; and controlling the first light-emitting control module to be switched on, and controlling the first initialization module, the second initialization module and the data write module to be switched off in a light-emitting stage.

18. A display panel, comprising a pixel circuit comprising:

a drive module;

a first storage module connected to a control terminal of the drive module, and is configured to store a voltage of the control terminal of the drive module;

a second storage module configured to store a voltage of a first terminal of the drive module or a voltage of a second terminal of the drive module;

a data write module connected between the control terminal of the drive module and a data line and configured to transmit a data voltage provided by the data line to the control terminal of the drive module in a data write stage;

a first light-emitting control module connected between a first power supply and the first terminal of the drive module and configured to transmit a voltage provided by the first power supply to the first terminal of the drive module after the first light-emitting control module is switched on;

a light-emitting module connected between the second terminal of the drive module and a second power supply; and, an initialization module, wherein;

the initialization module is configured to:

write an initialization voltage to the control terminal of the drive module and the light-emitting module in an initialization stage to initialize the control terminal of the drive module and the light-emitting module, and continuously write the initialization voltage to the control terminal of the drive module in a compensation stage while the data write module is in an off state.

19. The display panel of claim 18, wherein the initialization module comprises:

a first initialization module connected between the control terminal of the drive module and a first initialization signal line and configured to transmit a first initialization voltage provided by the first initialization signal line to the control terminal of the drive module after the first initialization module is switched on; and a second initialization module connected between a first terminal of the light-emitting module and a second initialization signal line, wherein a second terminal of the light-emitting module is connected to the second power supply, and the second initialization module is configured to transmit a second initialization voltage provided by the second initialization signal line to the first terminal of the light-emitting module after the second initialization module is switched on.

20. The display panel of claim 19, wherein a control terminal of the first initialization module is connected to a first scan line, a first terminal of the first initialization module is connected to the first initialization signal line, and a second terminal of the first initialization module is connected to the control terminal of the drive module;

a control terminal of the data write module is connected to a second scan line, a first terminal of the data write module is connected to the data line, and a second terminal of the data write module is connected to the control terminal of the drive module;

a control terminal of the second initialization module is connected to a third scan line, a first terminal of the second initialization module is connected to the second initialization signal line, and a second terminal of the second initialization module is connected to the first terminal of the light-emitting module;

a control terminal of the first light-emitting control module is connected to a light-emitting control signal line, a first terminal of the first light-emitting control module is connected to the first power supply, a second terminal of the first light-emitting control module is connected to the first terminal of the drive module, and the second terminal of the drive module is connected to the first terminal of the light-emitting module;

a first terminal of the first storage module is connected to the control terminal of the drive module, and a second terminal of the first storage module is connected to the second terminal of the drive module; and a first terminal of the second storage module is connected to the first power supply, and a second terminal of the second storage module is connected to the second terminal of the drive module.

* * * * *